United States Patent
Watanabe et al.

(10) Patent No.: US 7,389,038 B1
(45) Date of Patent: Jun. 17, 2008

(54) MULTIMEDIA INFORMATION RECORDING DEVICE AND METHOD FOR RECORDING MULTIMEDIA INFORMATION FILE ON RECORDING MEDIUM

(75) Inventors: Shuichi Watanabe, Chiba (JP); Keiichi Hibi, Matsudo (JP); Toshio Nomura, Ichihara (JP); Masahiro Shioi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/786,854

(22) PCT Filed: Sep. 6, 1999

(86) PCT No.: PCT/JP99/04827

§ 371 (c)(1),
(2), (4) Date: Jun. 13, 2001

(87) PCT Pub. No.: WO00/14740

PCT Pub. Date: Mar. 16, 2000

(30) Foreign Application Priority Data

Sep. 9, 1998 (JP) .................................. 10-254470

(51) Int. Cl.
*H04N 5/91* (2006.01)
(52) U.S. Cl. .......................................... 386/95; 386/112
(58) Field of Classification Search ................ 386/46, 386/95, 98, 111, 112, 125; 707/2

See application file for complete search history.

(56) References Cited

U.S. PATENT DOCUMENTS 5,210,734 A * 5/1993 Sakurai .................. 369/47.16

(Continued)

FOREIGN PATENT DOCUMENTS

CN 1168182 12/1997

(Continued)

OTHER PUBLICATIONS

"Advanced Streaming Format (ASF) Specification", Public Specification Version 1.0, Microsoft Corporation, Feb. 26, 1998.

(Continued)

*Primary Examiner*—Huy Nguyen
(74) *Attorney, Agent, or Firm*—David G. Conlin; John J. Penny, Jr.; Edwards Angell Palmer & Dodge LLP

(57) ABSTRACT

A multimedia information recording device is used for efficiently recording multimedia information (100) file storage area (111) on a recording medium (110). From the multimedia information given to the device, a data body DB and control information (HD and FD) are created and given to a file storage area writing section (106) where the data is written in parallel at a time on a free cluster in the file storage area. In the free area of each cluster where the data is written, dummy data is packed by a dummy data adding section (107) to absorb the difference between the first position of a cluster and the first position of the data in the cluster. Thus, data rewriting to eliminate this difference is avoided. Information for connecting plural clusters where data is written is created by a multimedia information file creating section (108), and the multimedia information is recorded in a multimedia information file on the recording medium.

15 Claims, 18 Drawing Sheets

U.S. PATENT DOCUMENTS

| | | | |
|---|---|---|---|
| 5,295,126 A | 3/1994 | Okano et al. | |
| 5,473,590 A | 12/1995 | Yokota et al. | |
| 5,566,379 A | 10/1996 | Mawatari et al. | |
| 5,703,997 A * | 12/1997 | Kitamura et al. | 386/97 |
| 5,801,781 A * | 9/1998 | Hiroshima et al. | 348/441 |
| 5,805,539 A | 9/1998 | Igarashi et al. | 369/47 |
| 5,819,290 A * | 10/1998 | Fujita | 707/2 |
| 6,763,037 B1 * | 7/2004 | Yanagihara et al. | 370/473 |

FOREIGN PATENT DOCUMENTS

| | | |
|---|---|---|
| EP | 0 598 411 A1 | 5/1994 |
| EP | 0 644 543 A1 | 3/1995 |
| JP | 04-225441 | 8/1992 |
| JP | 05-234329 | 9/1993 |
| JP | 06-162671 | 6/1994 |
| JP | 06-203534 | 7/1994 |
| JP | 6-236313 | 8/1994 |
| JP | 07-057436 | 3/1995 |
| JP | 09-224210 | 8/1997 |
| JP | 09-259528 | 10/1997 |
| JP | 09-330178 | 12/1997 |
| JP | 10-108133 | 4/1998 |
| JP | 11-176083 | 7/1999 |
| WO | WO 97/15924 | 5/1997 |
| WO | WO98/08223 | 2/1998 |

OTHER PUBLICATIONS

XP-002233381—Advanced Streaming Format (ASF) Specification Feb. 26, 1998—Public Specification Version 1.0.

Japanese Office Action dated Mar. 8, 2005 (and English translation thereof).

Chinese Office Action dated Jan. 7, 2005 (and English translation thereof).

* cited by examiner

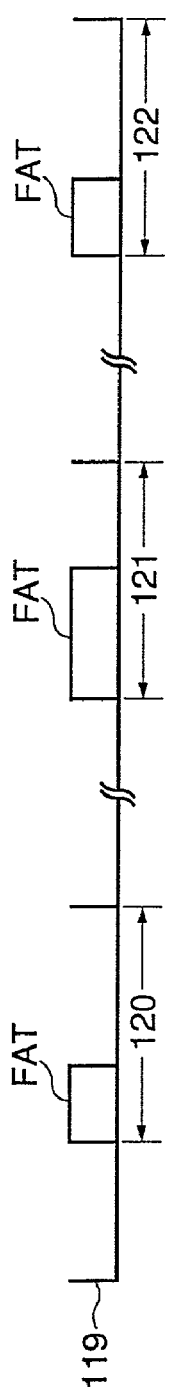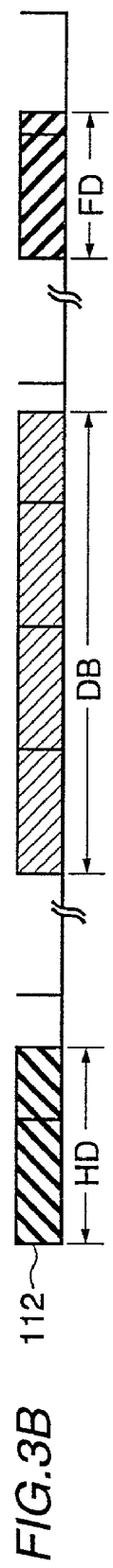
FIG.3A
FIG.3B
FIG.3C

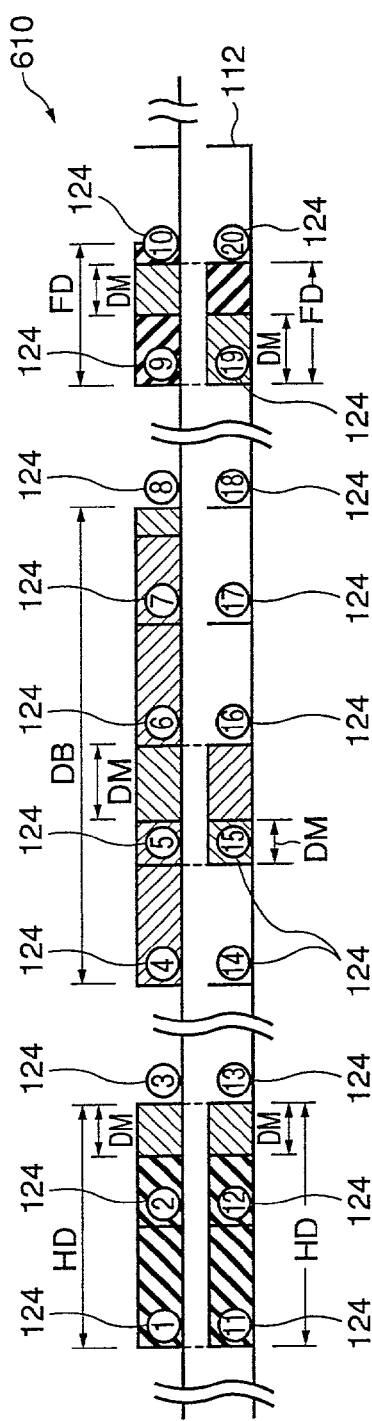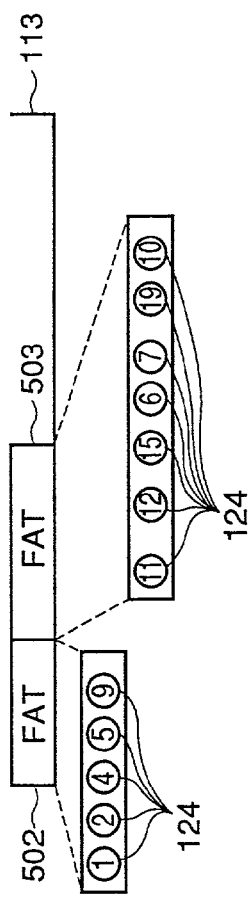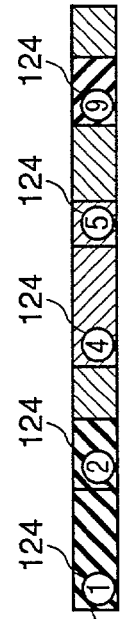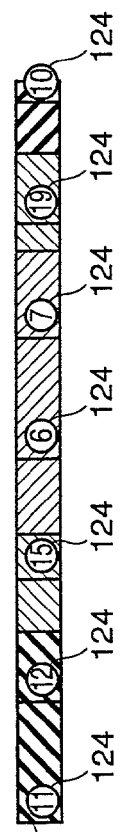
FIG.11A
FIG.11B
FIG.11C
FIG.11D

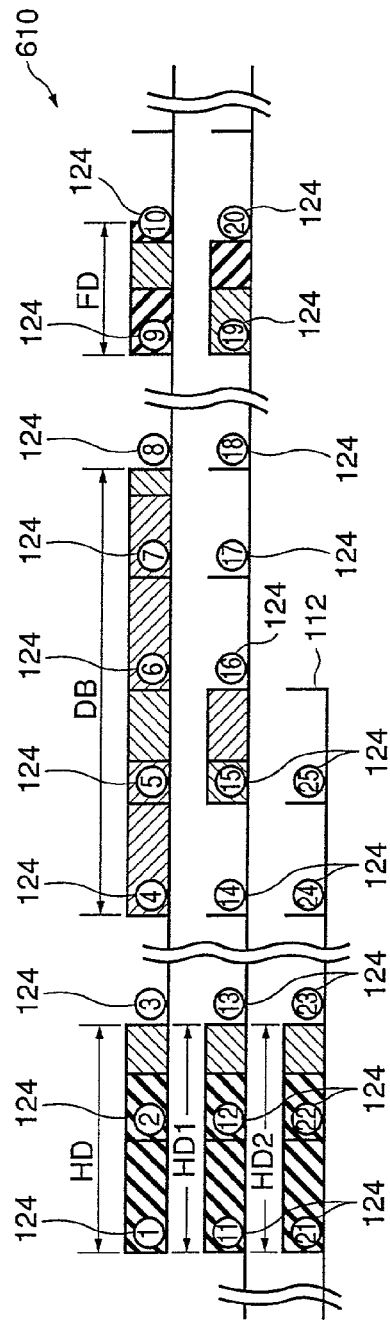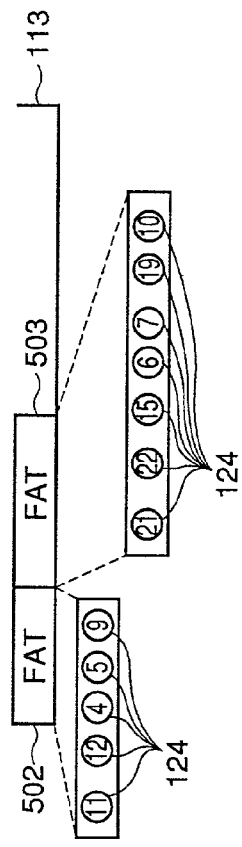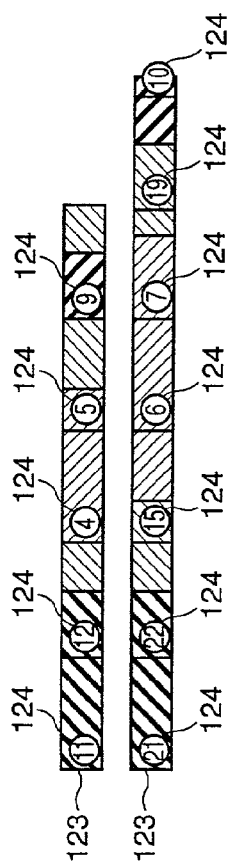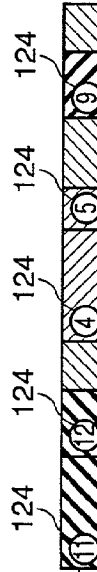
FIG.12A
FIG.12B
FIG.12C
FIG.12D

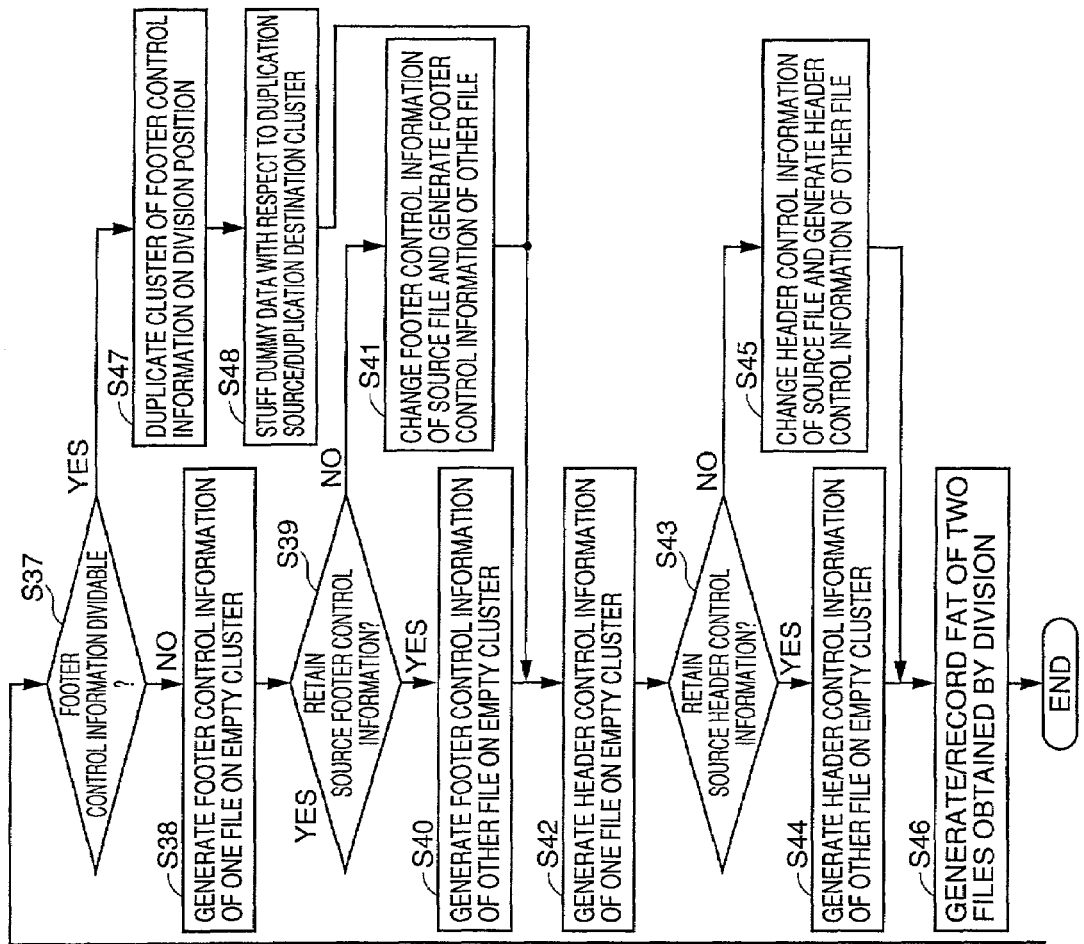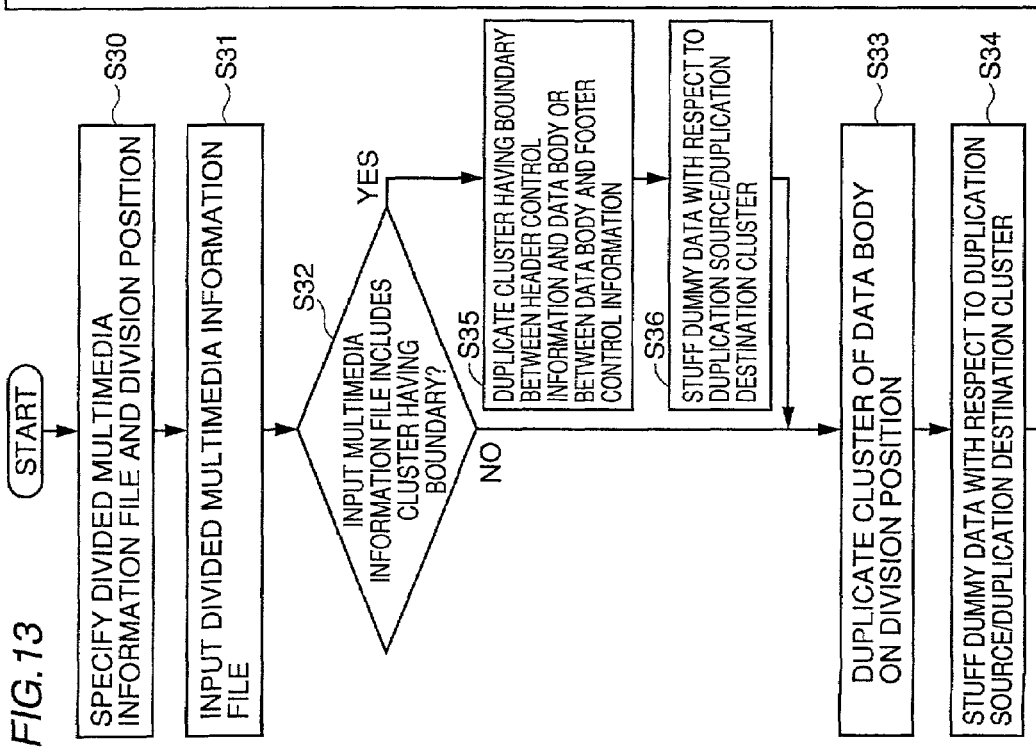
FIG.13

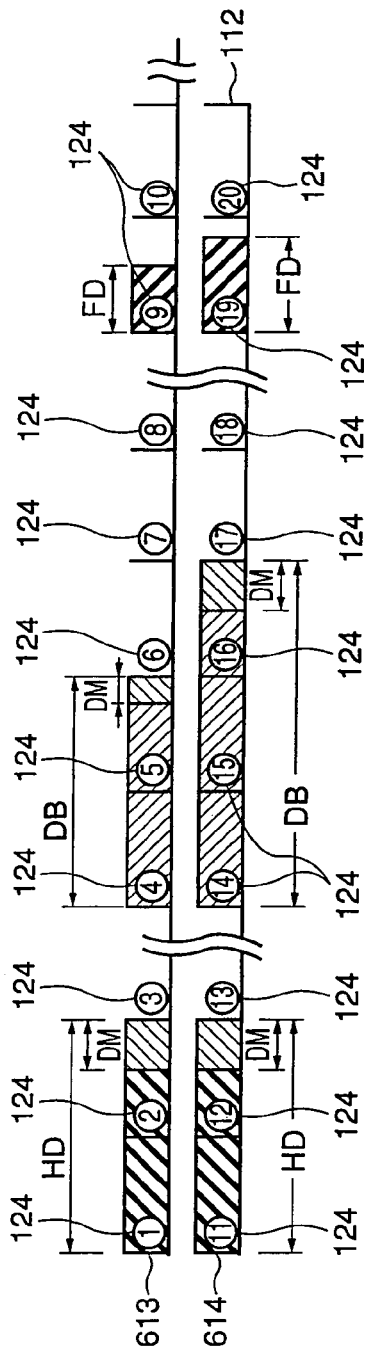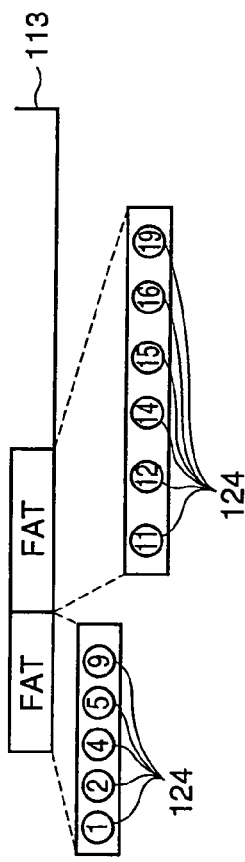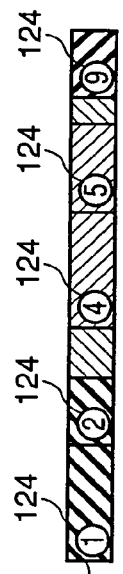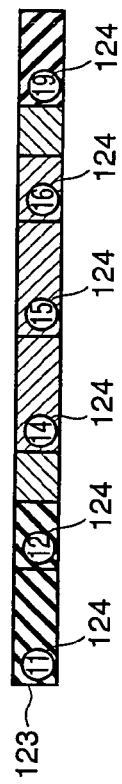
FIG. 14A
FIG. 14B
FIG. 14C
FIG. 14D

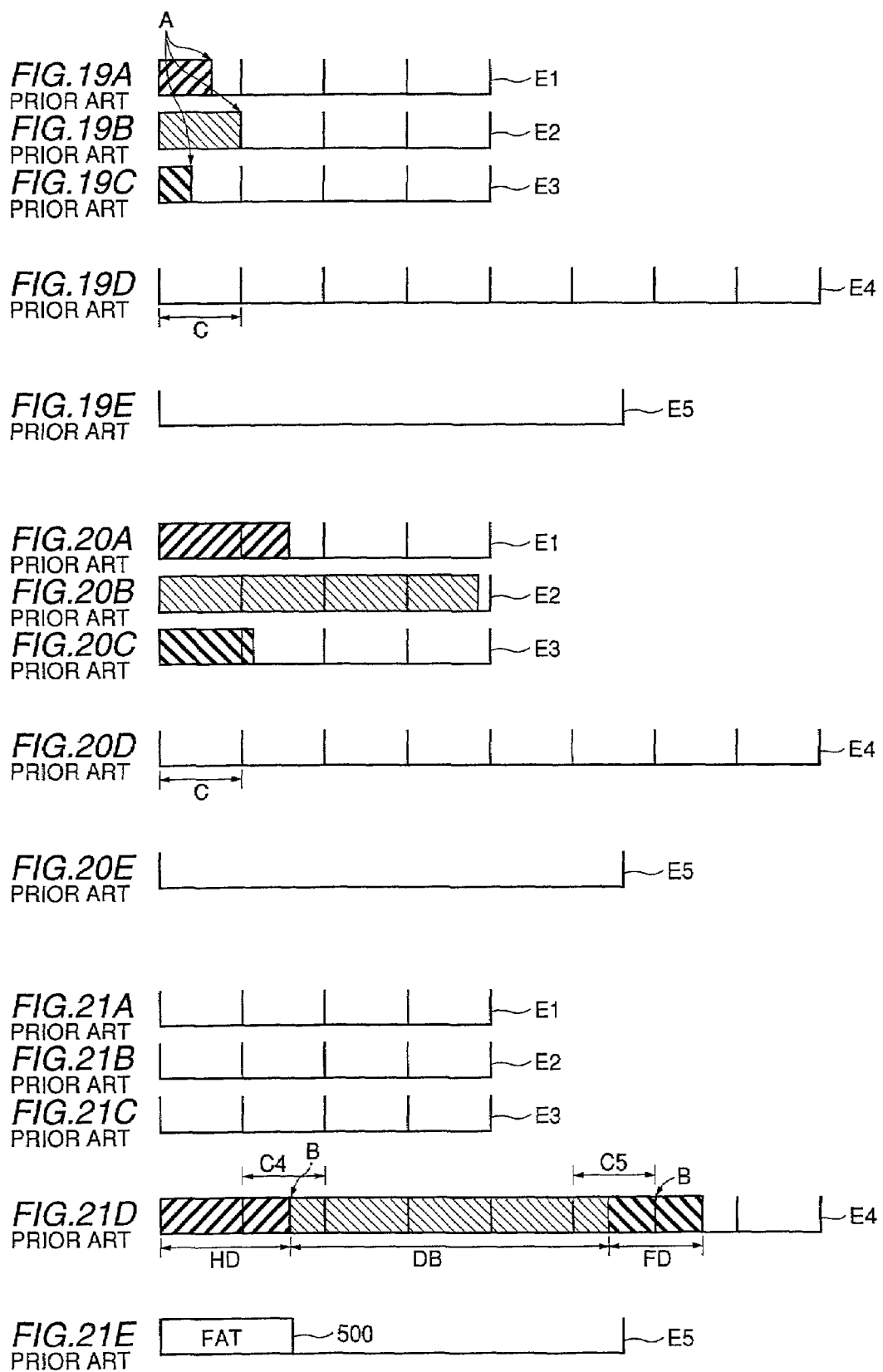

MULTIMEDIA INFORMATION RECORDING DEVICE AND METHOD FOR RECORDING MULTIMEDIA INFORMATION FILE ON RECORDING MEDIUM

TECHNICAL FIELD

The present invention relates to a multimedia information recording apparatus and a method for recording a file of multimedia information such as image information in a recording medium as well as a multimedia information reproducing apparatus, and more particularly, it relates to a multimedia information recording apparatus and a method in which efficiency of recording processing is improved, as well as a multimedia information reproducing apparatus.

BACKGROUND ART

In general, a file recording apparatus utilizing a DOS (abbreviation of Disk Operating System) file system is known as an apparatus recording multimedia information including information of motion pictures and voices. This conventional file recording apparatus is described with reference to FIG. 18 to FIG. 21.

The structure of a conventional multimedia information recording apparatus is shown in FIG. 18.

A file for storing multimedia information generally includes data (hereinafter referred to as a data body) of a body part of multimedia data and control information for controlling the data body. The data body may be raw data of a voice and a motion picture, or may be data previously coded by a coding technique such as MPEG (abbreviation of Motion Picture Experts Group), for example.

As to the fine where the corresponding multimedia information is stored, the control information includes information such as a file ID for identifying the file, the size of the file, the system of coding applied to the file etc., and information (hereinafter referred to as index information) for accessing the data body at random etc. The control information is arranged on the head part of the file, i.e., the front position (hereinafter referred to as a header position) of the data body, the rear part of the file, i.e., the rear position (hereinafter referred to as a footer position) of the data body, or the intermediate position of the file etc.

At this point, a case where control information is arranged on the header position and the footer position is illustrated, and the control information arranged on the respective positions is referred to as header control information HD and footer control information FD. Further, the overall file is referred to as a multimedia information file. In ASF (abbreviation of Advanced Streaming Format), for example, the information such as the file ID, the size, the applied coding system etc. as to the multimedia information file is included in the header control information HD, and the index information is included in the footer control information FD. ASF is described in detail in Advanced Streaming Format (ASF) Specification (Feb. 26, 1998 Public Specification Version 1.0/Microsoft Corporation).

Referring to FIG. 18, the multimedia information recording apparatus includes a multimedia information input control part 101 inputting multimedia information 100 obtained by photographing and coding processing etc. from an unillustrated front stage part and outputting the same to each part of a rear stage, as well as a header control information generation part 102, a data body generation part 103 and a footer control information generation part 104 generating and outputting the header control information HD, the data body DB and the footer control information FD respectively on the basis of the multimedia information 100 input from the multimedia information input control part 101. The multimedia information recording apparatus further includes respective ones of a header temporary storage area writing part 301, a data temporary storage area writing part 302 and a footer temporary storage area writing part 303 for inputting and temporarily storing output results from the respective ones of the header control information generation part 102, the data body generation part 103 and the footer control information generation part 104, a file storage area writing part 304 for writing all data in a recording medium (not shown) at a point of time when processing of generation and storage of all data terminates in the header control information generation part 102 to the footer temporary storage area writing part 303, a multimedia information file formation part 108 accepting and processing results of processing of the file storage area writing part 304 and a cluster management part 105 managing a write destination of data on the recording medium by the file storage area writing part 304.

At this point, the file is managed every cluster which is a used unit of a storage area on the recording medium with a table referred to as an FAT (abbreviation of File Allocation Table) where management information is stored in the DOS file system or the like. Each cluster may be formed by a plurality of sectors, for managing the file in units of sectors.

The FAT is recorded on the recording medium along with the multimedia information file. In the FAT, information for specifying at least one cluster where data forming the corresponding multimedia information file is stored is stored according to the sequence for forming the file. Therefore, arrangement of a plurality of clusters where the data of the multimedia information file are stored on the recording medium may be physically continuous arrangement, or may be random arrangement.

The cluster management part 105 manages a cluster (hereinafter referred to as an empty cluster) area of the recording medium not written with effective data but in a state capable of writing new data, the so-called empty state. After termination of writing of data in the recording medium by the file storage area writing part 304, the multimedia information file formation part 108 appends information specific to the file system etc. to a series of data stored on the recording medium and completes the formal requirements as the file, while performing generation and updating of the FAT in a file generation stage.

The file storage area writing part 304 monitors the state of a cluster where data is currently written, and when detecting that data is fully written in the cluster and the writing terminates, it posts this purport to the cluster management part 105 and supplies position information indicating the position of the cluster where the writing terminates in the recording medium to the multimedia information file formation part 108. At this point, the information indicating the position of the cluster in the recording medium is referred to as cluster position information.

When receiving the aforementioned notice from the file storage area writing part 304, the cluster management part 105 returns cluster position information of an empty cluster where data must be subsequently written to the file storage area writing part 304. On the other hand, the multimedia information file formation part 108 updates the contents of the FAT on the basis of the position information of the cluster terminating the writing supplied from the file storage area writing part 304. At a point of time when all data are completely written in the recording medium, the file storage area writing part 304 posts the cluster position information of a cluster where data has been finally written to the multimedia information file formation part 108. In response to this notice, the multimedia information file formation part 108 completes the FAT and forms the multimedia information file.

In FIG. 19A to FIG. 19E, states of respective storage areas during generation of data in the multimedia information recording apparatus of FIG. 18 are typically shown. By arrows A in FIG. 19A to FIG. 19C, positions where data are currently written in the respective storage areas are shown. In the multimedia information recording apparatus in the aforementioned manner, the respective ones of the head control information HD, the data body DB and the footer control information FD are generated by the respective ones of the header control information generation part 102, the data body generation part 103 and the footer control information generation part 104, and the respective ones of the information are concurrently written in respective ones of a header temporary storage area E1 (see FIG. 19A), a data temporary storage area E2 (see FIG. 19B) and a footer temporary storage area E3 (see FIG. 19C) on an unillustrated buffer memory area by the header temporary storage area writing part 301, the data temporary storage area writing part 304 and the footer temporary storage area writing part 303. At this point of time, no data are written in a data storage area E4 (see FIG. 19D) having a plurality of clusters C, which is a file storage area on the recording medium, and an FAT storage area E5 (see FIG. 19E).

In FIG. 20A to FIG. 20E, states of the respective storage areas in termination of generation of data in the multimedia information recording apparatus of FIG. 18 are typically shown. In FIG. 21A to FIG. 21E, states of the respective storage areas in file formation in the multimedia information recording apparatus of FIG. 18 are typically shown. When generation of the header control information HD, the data body DB and the footer control information FD terminates in the multimedia information recording apparatus, the states of the respective storage areas become those of FIG. 20A to FIG. 20C. The header control information HD, the data body DB and the footer control information FD written in the respective temporary storage areas are recorded in the file storage area E4 on the recording medium (see FIG. 21D). At this time, an FAT 500 corresponding to the file storage area E4 is generated in the FAT storage area E5 on the recording medium. Thus, the multimedia information file is formed on the recording medium.

In this case, the rearmost end part of the header control information HD and the head part of the data body DB are recorded in one cluster C4, and the rearmost end part of the data body DB and the head part of the footer control information FD are recorded in one cluster C5, as shown in FIG. 21D. The respective ones of the clusters C4 and C5 include boundaries (hereinafter simply referred to as boundaries) shown by arrows B where data of different types are adjacent.

In the multimedia information recording apparatus of FIG. 18, the sizes of the header control information HD, the data body DB and the footer control information FD are unidentified until generation of the respective ones terminates. Therefore, write processing of twice of generating the respective data while temporarily making the same stored in the respective ones of the temporary storage areas E1 to E3 different from the recording medium and writing each generated data in the file storage area E4 of the actual recording medium at a point of time when generation of the respective data is completed and the sizes of the respective data are defined has been performed. Thus, the conventional generation processing of the multimedia information file has been redundant processing. This enlarges loss related to the processing particularly when the size of each data enlarges. Therefore, it is desirable that each data is directly written in the file storage area E4 of the recording medium in the stage where the same is generated.

While the multimedia information recording apparatus of FIG. 18 sets the temporary storage areas E1 to E3 to buffer memory areas different from areas on the recording medium, these temporary storage areas E1 to E3 may be provided on the recording medium depending on limitation of a hardware scale etc. In this case, processing such as movement and copying etc. of data on the recording medium takes place at a point of time when the multimedia information file is finally created. When a recording medium such as a flash memory, for example, slow in writing is utilized, therefore, the processing time extremely lengthens and it is not excellent in practicalness. When the cluster C4 or C5 including a boundary is present in the file storage area E4 as shown in FIG. 21A to FIG. 21E, a process for acquiring an access position (position of the boundary) in the multimedia information file is required in edit processing of dividing the multimedia information file or mutually connecting the same is required and hence the edit processing is complicated and not excellent in practicalness.

DISCLOSURE OF THE INVENTION

An object of the present invention is to provide a multimedia information recording apparatus and a method capable of writing a multimedia information file in a recording medium at a high speed and efficiently, as well as a multimedia information reproducing apparatus.

Another object of the present invention is to provide a multimedia information recording apparatus and a method capable of readily edit-processing a multimedia information file.

According to one aspect of the present invention, a multimedia information recording apparatus comprises a file writing part and a link information writing part, in order to record a multimedia information file having a data body and control information for controlling the data body on a recording medium every specific area having a specific size. Preferably, the aforementioned multimedia information recording apparatus further comprises a dummy data writing part writing dummy data in an empty area in each of the specific areas where data are written. The recording medium at least has a data area where the multimedia information file is recorded and a management information area where information for managing the state of arrangement of the multimedia information file recorded in the data area is recorded. In the file writing part, a plurality of specific areas of the data area in an empty state capable of data writing for writing the data body and the control information respectively are specified, and the data body and the control information are written in the specified plurality of specific areas in an arbitrary sequence in parallel. In the link information writing part, area link information for linking at least one specific area where the data body and the control information are written according to the sequence for forming the multimedia information file is created and written in the management information area.

When the data body and the control information are directly written on the recording medium in units of the specific areas, dummy data is written in an empty area in each specific area where data is written and the empty area is rendered effective, while link information for linking all specific areas subjected to data writing is created and recorded for forming the multimedia information file in the aforementioned multimedia information recording apparatus. Therefore, redundant write processing of multimedia information is omitted, and the multimedia information file can be efficiently created and recorded on the recording medium.

According to another aspect of the present invention, a multimedia information recording apparatus comprises a data body changing part, a control information generation part and a link information writing part, in order to record a multimedia information file having a data body and control information for controlling the data body on a recording medium every specific area while dividing the same into a plurality of different multimedia information files on a prescribed position. The data body changing part and the control information generation part preferably further comprise a dummy data writing part. The recording medium at least has a data area where the multimedia information file is recorded and a management information area where information for managing the arrangement state of a record of the multimedia information file in the data area is recorded. In the data body changing part, contents recorded in a specific area corresponding to the specific position in the data body are duplicated, and contents obtained by duplication are written in a specific area of the data area, which is in an empty state. At this time, dummy data is written with respect to, in two specific areas where identical contents are recorded by duplication, respective ones of a precedent area from the prescribed position in one specific area and a subsequent area from the prescribed position in the other specific area by the dummy data writing part. In the control information generation part, a specific area where control information for the respective ones of multimedia information files obtained by division is written is generated. By the dummy data writing part, dummy data is written in the empty area in the specific area where the control information is written. In the link information writing part, area link information for linking a plurality of specific areas where the data body and the control information are written, including at least one specific area where data are written by the data body changing part and the control information generation part, according to the sequence for forming the respective ones of the multimedia information files obtained by division is created and written in the management information area. The multimedia information recording apparatus is preferably so formed that the control information generation part generates the control information corresponding to the respective ones of the multimedia information files obtained by division in respective ones of a plurality of specific areas on the basis of the control information of the multimedia information file before division.

In the aforementioned multimedia information recording apparatus, the contents of the specific area of the position where division is specified are duplicated to another specific area, and dummy data are written in areas not effective in respective ones of obtained two specific areas as a result. When specific areas where control information is written are generated as to the respective ones of the multimedia information files obtained by division, the area link information for linking a plurality of specific areas where the data body and the control information are written is created and recorded, in order to form the respective ones of the multimedia information files obtained by division. Therefore, deviation of the head positions of the specific areas and the head positions of the data resulting from division is eliminated by writing of the dummy data, and the multimedia information file can be readily divided.

In the aforementioned multimedia information recording apparatus, at least one specific area where the control information of the multimedia information file before division has been recorded and at least one specific area of the empty state in the data area are preferably included in the plurality of specific areas where the control information of the plurality of multimedia information files obtained by division is written. Therefore, the specific area where the control information of the multimedia information file before division has been recorded is diverted to the specific areas where the control information for the plurality of multimedia information files obtained by division, and the storage area can be effectively put to practical use.

In the aforementioned multimedia information recording apparatus, each of the plurality of specific areas where the control information of the plurality of multimedia information files obtained by division is the specific area of the empty state in the data area. Therefore, the contents of the specific area where the control information of the multimedia information file before division has been recorded are retained, and hence, also when cancellation of division processing is desired after file division, the control information of the multimedia information file before division can be obtained, and it is excellent in practicalness.

According to still another aspect of the present invention, a multimedia information recording apparatus comprises a control information generation part and a link information writing part, in order to record a plurality of multimedia information files having data bodies and control information for controlling the data bodies on a recording medium every specific area while connecting the same into a single multimedia information file. The control information generation part preferably further comprises a dummy data writing part. The recording medium at least has a data area where the multimedia information files are recorded and a management information area where information for managing the state of arrangement of the multimedia information files in the data area is recorded. The control information generation part generates a specific area where control information for the multimedia information file obtained by connection is written. The dummy data writing part writes dummy data in an empty area in the specific area where the control information is written. The link information writing part creates area link information for linking at least one specific area where the data bodies of the plurality of multimedia information files are written and the specific area where the control information has been written by the control information generation part according to the sequence for forming the multimedia information file obtained by connection and writes the same in the management information area.

In the aforementioned multimedia information recording apparatus, an empty area of the multimedia information file obtained by connection is written with dummy data and rendered effective, while control information for the multimedia information file obtained by connection and area link information for linking a plurality of specific areas for forming the file are created and recorded. Therefore, deviation of the head positions of the specific areas and the head positions of the data resulting from connection is eliminated by writing of the dummy data, and the multimedia information files can be readily connected.

In the aforementioned multimedia information recording apparatus, the control information generation part preferably has a changing part changing contents of a specific area where the control information of an arbitrary multimedia information file of the plurality of multimedia information files is written to the control information for the multimedia information file obtained by connection and a deletion part deleting partial contents of a specific area where control information of another multimedia information file is written. Therefore, the specific area where the control information of the arbitrary multimedia information file before being connected has been recorded is diverted to the specific area where the control information for the multimedia information file obtained by connection is written, and the storage area can be effectively put into practical use.

In the aforementioned multimedia information file recording apparatus, the control information generation part preferably has a writing part writing the control information for the multimedia information file obtained by connection in the specific area of the empty state of the data area. Therefore, the contents of the specific area where the control information of each multimedia information file before being connected are retained, and hence, also when cancellation of connection processing is desired after file connection, the control information of each multimedia information file before being connected can be obtained, and it is excellent in practicalness.

According to a further aspect of the present invention, a multimedia information recording method comprises a file writing step and a link information writing step, in order to record a multimedia information file having a data body and control information for controlling the data body on a recording medium every specific area having a specific size. The multimedia information recording method preferably further comprises a dummy data writing step. The recording medium at least has a data area where the multimedia information file is recorded and a management information area where information for managing the state of arrangement of the multimedia information file recorded in the data area is recorded. In the file writing step, a plurality of specific areas of the data area in an empty state capable of data writing for writing the data body and the control information respectively are specified, and the data body and the control information are written in the specified plurality of specific areas in an arbitrary sequence in parallel. In the dummy data writing step, dummy data is written in an empty area in the specific area where the data body and the control information are written. In the link information writing step, area link information for linking at least one specific area where the data body and the control information are written according to the sequence for forming the multimedia information file is created and written in the management information area.

In the aforementioned multimedia information recording method, an empty area in each specific area where data is written is written with dummy data and rendered effective when the data body and the control information are directly written on the recording medium in units of specific areas, and link information for linking all specific areas subjected to data writing is created and recorded in order to form the multimedia information file. Therefore, redundant write processing of multimedia information is omitted, and the multimedia information file can be efficiently created and recorded on the recording medium.

According to a further aspect of the present invention, a multimedia information recording method comprises a data body changing step, a control information generation step and a link information writing step, in order to record a multimedia information file having a data body and control information for controlling the data body on a recording medium every specific area while dividing the same into a plurality of different multimedia information files on a prescribed position. The data body changing step and the control information generation step preferably further comprise a dummy data writing step. The recording medium has a data area where the multimedia information file is recorded and a management information area where information for managing the arrangement state of a record of the multimedia information file in the data area is recorded. In the data body changing step, contents recorded in the specific area corresponding to the prescribed position in the data body are duplicated and contents obtained by duplication are written in a specific area of the data area, which is in an empty state. At this time, dummy data are written with respect to, in two specific areas where identical contents are recorded by duplication, respective ones of a precedent area from the prescribed position in one specific area and a subsequent area from the prescribed position in another specific area by the dummy data writing step. In the control information generation step, a specific area where control information for each of the multimedia information files obtained by division is written is generated. By the dummy data writing step, dummy data is written in the empty area in the specific area where the control information is written. In the link information writing step, area link information for linking a plurality of specific areas where the data body and the control information are written, including at least one specific area where data are written by the data body changing step and the control information generation step, according to the sequence for forming the respective ones of the multimedia information files obtained by division is created and written in the management information area.

In the aforementioned multimedia information recording method, contents of the specific area of the position where division is specified are duplicated to another specific area, and dummy data are written in areas not effective in the respective ones of two obtained specific areas as a result. When the specific areas where the control information is written are generated as to the respective ones of the multimedia information files obtained by division, the area link information for linking the plurality of specific areas where the data body and the control information are written is created and recorded, in order to form the respective ones of the multimedia information files obtained by division. Therefore, deviation of the head positions of the specific areas and the head positions of the data resulting from division is eliminated by writing of the dummy data, and the multimedia information file can be readily divided.

According to a further aspect of the present invention, a multimedia information recording method comprises a control information generation step and a link information writing step, in order to record a plurality of multimedia information files having data bodies and control information for controlling the data bodies on a recording medium every specific area while connecting the same into a single multimedia information file. The control information generation step preferably further comprises a dummy data writing step. The recording medium at least has a data area where the multimedia information files are recorded and a management information area where information for managing the state of arrangement of the multimedia information files in the data area is recorded. In the control information generation step, a specific area where control information for the multimedia information file obtained by connection is written is generated. In the dummy data writing step, dummy data is written in an empty area in the specific area where the control information is written. In the link information writing step, area link information for linking at least one specific area where the data bodies of the plurality of multimedia information files are written and the specific area where the control information has been written by the control information generation part according to the sequence for forming the multimedia information file obtained by connection is created and written in the management information area.

In the aforementioned multimedia information recording method, an empty area of the multimedia information file obtained by connection is written with dummy data and rendered effective, while the control information for the multimedia information file obtained by connection and the area link information for linking a plurality of specific areas for forming the file are created and recorded. Therefore, deviation of the head positions of the specific areas and the head positions of the data resulting from connection is eliminated by writing of the dummy data, and the multimedia information files can be readily connected.

A multimedia information recording apparatus according to a further aspect of the present invention records a multimedia information file having a data body including data for forming an image and control information for controlling the data body on a recording medium every specific area having a specific size while dividing the same into a plurality of different multimedia information files on a prescribed position.

The recording medium at least has a data area where the multimedia information file is recorded and a management information area where information for managing the state of arrangement of the multimedia information file in the data area is recorded.

The multimedia information recording apparatus comprises a data body changing part, a control information generation part and a link information writing part.

The data body changing part duplicates contents recorded in a specific area corresponding to the prescribed position in the data body and writes contents obtained by duplication in a specific area of the data area in an empty state capable of being written with data while writing dummy data with respect to a precedent area from the prescribed position in one specific area in two specific areas where identical contents are recorded by duplication.

The control information generation part generates specific areas where control information for the respective ones of the multimedia information files obtained by division is written.

The link information writing part creates area link information for linking a plurality of specific areas where the data body and the control information are written, including at least one specific area where the data body and the control information are written by the data body changing means and the control information generation means, according to the sequence for forming the respective ones of the multimedia information files obtained by division and writes the created area link information in the management information area.

A multimedia information recording apparatus according to a further aspect of the present invention is an apparatus recording a multimedia information file having a data body including data for forming an image and control information for controlling the data body on a recording medium every specific area having a specific size while dividing the same into a plurality of different multimedia information files on a prescribed position, and has the following characteristics:

That is, the recording medium at least has a data area where the multimedia information file is recorded and a management information area where information for managing the state of arrangement of the multimedia information file in the data area is recorded.

The multimedia information recording apparatus comprises a data body changing part, a control information generation part and a link information writing part.

The data body changing part duplicates data of a subsequent area from the prescribed position in contents recorded in a specific area corresponding to the prescribed position in the data body and writes contents obtained by duplication in a specific area of the data area in an empty state capable of being written with data, while writing dummy data with respect to an empty area other than the area where the duplicated data is written in the specific area.

The control information generation part generates a specific area where control information for the respective ones of the multimedia information files obtained by division is written.

The link information writing part creates area link information for linking a plurality of specific areas where the data body and the control information are written, including at least one specific area where the data body and the control information are written by the data body changing means and the control information generation means, according to the sequence for forming the respective ones of the multimedia information files obtained by division and writes the created area link information in the management information area.

In the aforementioned multimedia information recording apparatus, contents of a specific area of a position where division is specified are duplicated to another specific area, and dummy data are written in areas not effective in the respective ones of two obtained specific areas as a result. When specific areas where control information is written are generated as to the respective ones of the multimedia information files obtained by division, area link information for linking a plurality of specific areas where the data body and the control information are written is created and recorded, in order to form the respective ones of the multimedia information files obtained by division. Therefore, deviation of the head positions of the specific areas and the head positions of the data resulting from division is eliminated by writing of the dummy data, and the multimedia information file can be readily divided.

A multimedia information recording apparatus according to a further aspect of the present invention is a multimedia information recording apparatus recording a multimedia information file having a data body including data for forming an image and control information including information as to the overall file and for controlling the data body on a recording medium, and has the following characteristics: That is, the control information includes dummy data so that the control information is in a prescribed size, and the multimedia information recording apparatus comprises a file writing part writing the data body and the control information including the dummy data on the recording medium and a part writing size information indicating the actual size of the control information including the dummy data and the size of the dummy data on the recording medium.

A multimedia information reproducing apparatus reproducing a multimedia information file recorded by the aforementioned multimedia information recording apparatus from a recording medium has the following characteristic: That is, it skips an area where dummy data is written and reproduces control information and a data body of the multimedia information on the basis of size information indicating the actual size of the control information including the dummy data and the size of the dummy data.

The aforementioned and other objects, features, aspects and advantages of the present invention are more clarified from the detailed description of the present invention described later by referring to the accompanying drawings.

BRIEF DESCRIPTION OF THE DRAWINGS

FIG. 3A to FIG. 3C are diagrams illustrating states of the respective ones of the storage areas at the time of termination of data generation according to the first embodiment of the present invention respectively.

FIG. 11A and FIG. 11B are diagrams illustrating states of the respective ones of the storage areas after file division processing in the second embodiment of the present invention respectively, and FIG. 11C and FIG. 11D are diagrams showing files output in the respective states of FIG. 11A and FIG. 11B respectively.

FIG. 12A and FIG. 12B are diagrams illustrating other states of the respective ones of the storage areas after file division processing in the second embodiment of the present invention respectively, and FIG. 12C and FIG. 12D are diagrams showing files output in the respective states of FIG. 12A and FIG. 12B respectively.

FIG. 13 is a flow chart of file division processing in the second embodiment of the present invention.

FIG. 14A and FIG. 14B are diagrams illustrating states of storage areas before file connection processing in the third embodiment of the present invention respectively, and FIGS. 14C and 14D are diagrams showing files output in the states of FIG. 14A and FIG. 14B respectively.

FIG. 19A to FIG. 19E are diagrams illustrating states of respective ones of storage areas during data generation in the conventional multimedia information recording apparatus respectively.

FIG. 20A to FIG. 20E are diagrams illustrating states of the respective ones of the storage areas at the time of termination of data generation in the conventional multimedia information recording apparatus respectively.

FIG. 21A to FIG. 21E are diagrams illustrating states of the respective ones of the storage areas in file formation in the conventional multimedia information recording apparatus respectively.

BEST MODES FOR CARRYING OUT THE INVENTION

Each embodiment of the present invention is now described in detail with reference to the drawings.

First Embodiment

Figure 1:
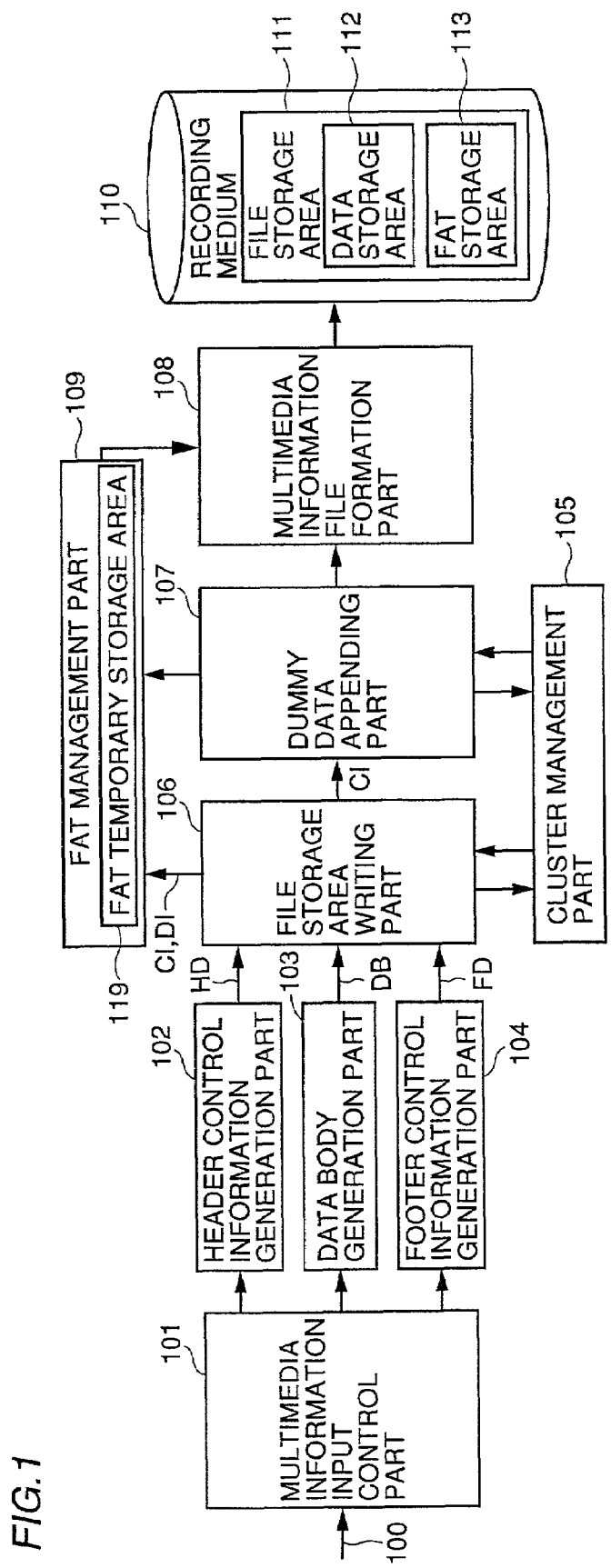
FIG. 1 is a block diagram showing the structure of a multimedia information recording apparatus according to a first embodiment of the present invention.
Figure 2A:
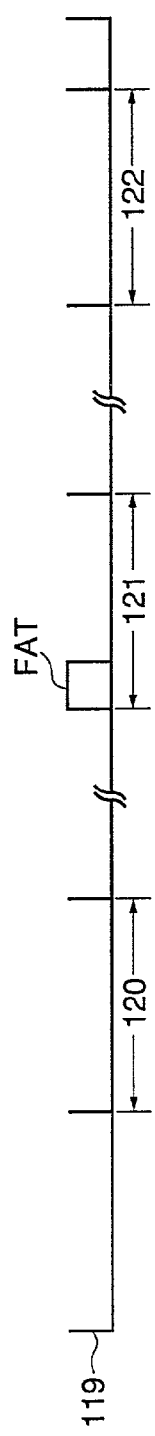
FIG. 2A to FIG. 2C are diagrams illustrating states of respective ones of storage areas during data generation according to the first embodiment of the present invention respectively.
Figure 2B:
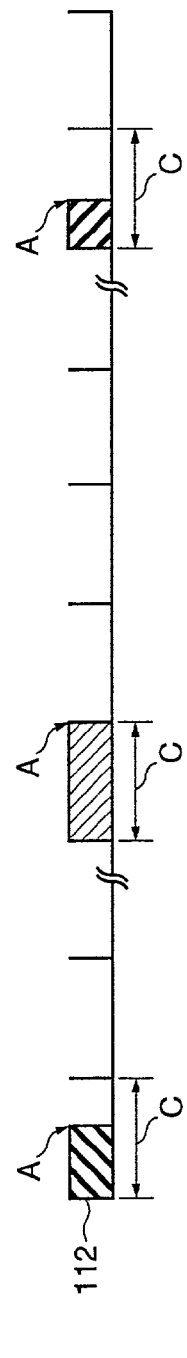
Figure 2C:
Figure 18:
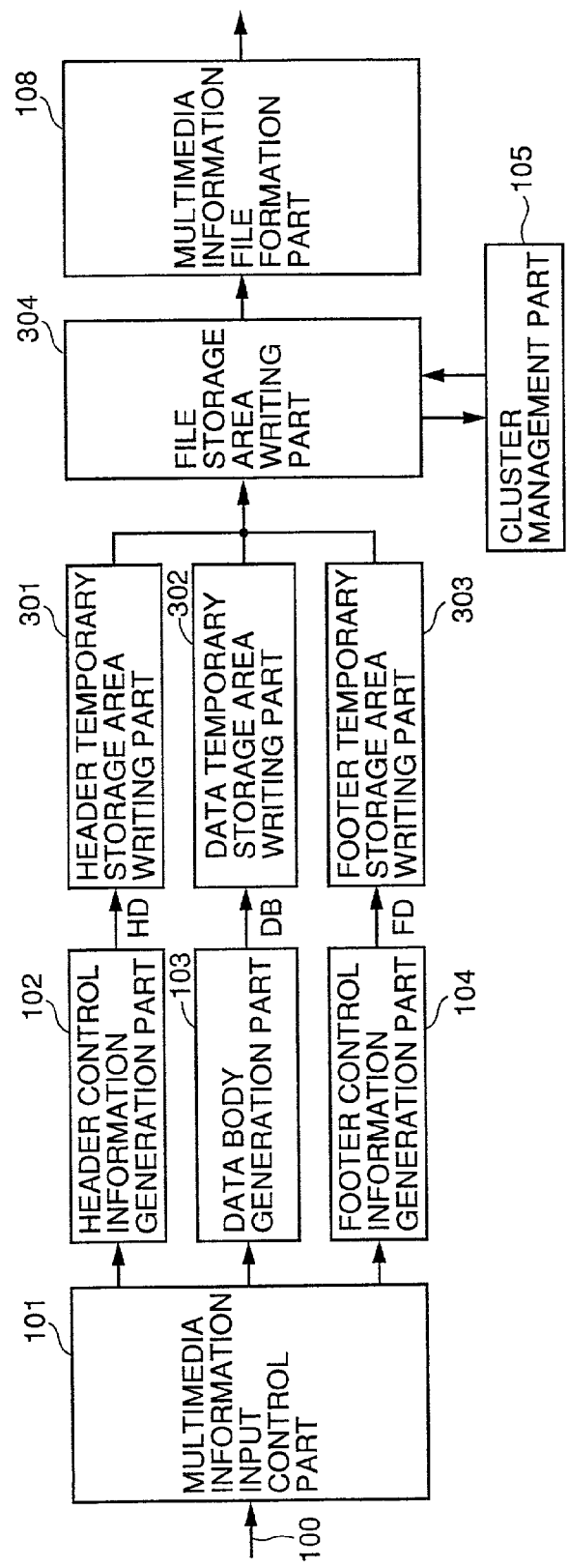
FIG. 18 is a block diagram showing the structure of a conventional multimedia information recording apparatus.

While a multimedia information recording apparatus according to a first embodiment is described with reference to FIG. 1 to FIG. 6, identical numerals are assigned to the same parts as the aforementioned conventional apparatus, and description thereof is omitted. Referring to FIG. 1, a different point when comparing the structures of the multimedia information recording apparatus according to this embodiment and the conventional multimedia information recording apparatus shown in FIG. 18 resides in a point that the apparatus of FIG. 1 comprises a file storage area writing part 106, a dummy data appending part 107 and an FAT management part 109 in substitution for the header temporary storage area writing part 301 to the file storage area writing part 304 of the apparatus of FIG. 18. The remaining parts of FIG. 1 are identical to those of FIG. 18, and description is omitted. In FIG. 2A to FIG. 2C, states of respective storage areas during data generation in the apparatus of FIG. 1 are shown.

Referring to FIG. 1, the multimedia information recording apparatus comprises the file storage area writing part 106, in order to record header control information HD, a data body DB and footer control information FD output from respective ones of a header control information generation part 102, a data body generation part 103 and a footer control information generation part 104 directly in a file storage area 111 of a recording medium 110. The file storage area 111 is an area for such a purpose that multimedia information input in this apparatus is written in a file format, and includes a data storage area 112 where contents of a multimedia information file are written in units of clusters C and an FAT storage area 113 where an FAT is written, as shown in FIG. 2B and FIG. 2C. The recording medium 110 is a medium accessible at random such as a semiconductor memory, a flash memory or a hard disk. The FAT shows the state of arrangement of data of the multimedia information file in the data storage area 112.

The file storage area writing part 106 writes the respective ones of the header control information HD, the data body DB and the footer control information FD in parallel in the data storage area 112 of FIG. 2B. At this time, the file storage area writing part 106 monitors the state of each cluster C corresponding to a position shown by arrow A where data is currently written, and when determining that any cluster C is filled up with data, writing of data is already impossible and data writing in the cluster C has completed, it posts this purport to the cluster management part 105 while requiring an empty cluster C in the data storage area 112 to be subsequently written. The file storage area writing part 106 supplies cluster position information CI of the cluster C where writing of data has terminated to the FAT management part 109 along with data indication information DI indicating which data of the header control information HD, the data body DB and the footer control information FD the data written in the cluster C is.

On the basis of the data indication information DI accepted from the file storage area writing part 106, the FAT management part 109 writes and stores the cluster position information CI accepted with the data indication information DI in an internal FAT temporary storage area 119 as to the respective ones of the header control information HD, the data body DB and the footer control information FD. At a point of time when the FAT is generated in a multimedia information file formation part 108, the FAT management part 109 sequentially reads the cluster position information CI per each data from the FAT temporary storage area 119 and outputs the same to the multimedia information file formation part 108. As a management method for the cluster position information CI employing the FAT temporary storage area 119 in the FAT management part 109, there is a method of providing respective ones of a corresponding header FAT temporary storage area 120, a data FAT temporary storage area 121 and a footer FAT temporary storage area 122 as to the respective ones of the header control information HD, the data body DB and the footer control information FD and temporarily generating an FAT as to the corresponding data in each temporary storage area etc., as shown in FIG. 2A At a point of time when data generation of all of the header control information HD, the data body DB and the footer control information FD terminates, the file storage area writing part 106 supplies the cluster position information CI of each cluster C where each data has been finally written to the FAT management part 109 along with the data indication information DI. At this time, it is posted to the FAT management part 109 that data generation has terminated. The FAT management part 109 accepts the notice of data generation termination, and information for FAT generation is sequentially read from the FAT temporary storage area 119 in response and output to the multimedia information file formation part 108.

The file storage area writing part 106 supplies the cluster position information CI of each cluster C where data has been finally written to the dummy data appending part 107. When there is an area (hereinafter referred to as an empty area) not written with effective data but in a state capable of writing data in the cluster C indicated by each accepted cluster position information CI, the dummy data appending part 107 writes dummy data DM in the empty area in a manner stuffing (stuff) the same. Thus, the dummy data DM is stuffed as to each cluster C indicated by the cluster position information CI at the time of termination of data generation. At this point, the dummy data DM is data to be written in the empty area in a manner being stuffed, in order to render the empty area in the generated multimedia information file effective.

In the multimedia information recording apparatus of FIG. 1, the respective ones of the header control information HD, the data body DB and the footer control information FD are directly written in the data storage area 112 in the file storage area 111 on the recording medium 110 simultaneously with being generated, as shown in FIG. 2A to FIG. 2C. At this time, the FAT is formed by the multimedia information file formation part 108 on the basis of information read from the FAT temporary storage area 119, and the formed FAT is written in the FAT storage area 113 of the file storage area 111.

About the header control information HD, the data body DB and the footer control information FD, there is no limitation in relation to the sequence recorded in the data storage area 112. It is also possible to write the respective data in current write positions of the data storage area 112 shown by arrows A of FIG. 2B any time at the point of time when the same are generated. It is also possible that three writing heads are provided in relation to the data storage area 112 to simultaneously write corresponding data in three different areas on the data storage area 112.

Figure 4A:
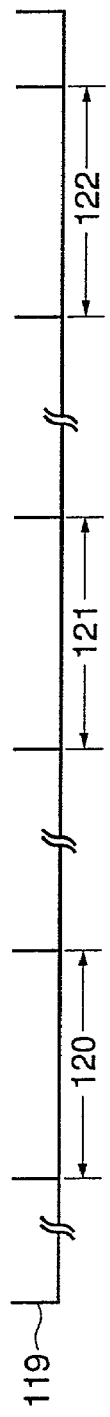
FIG. 4A to FIG. 4C are diagrams illustrating states of the respective ones of the storage areas at the time of file formation according to the first embodiment of the present invention respectively.
Figure 4B:
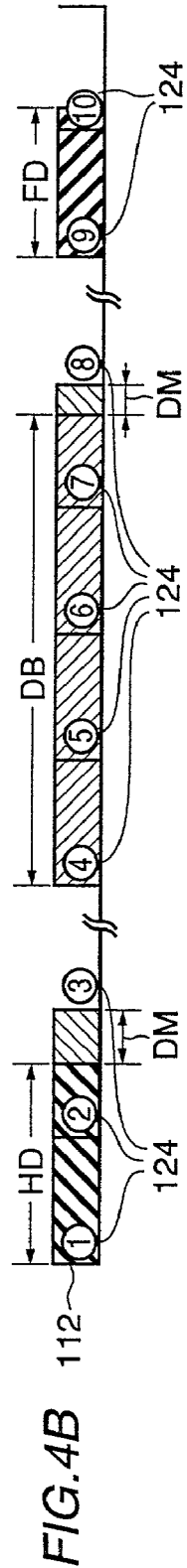
Figure 4C:
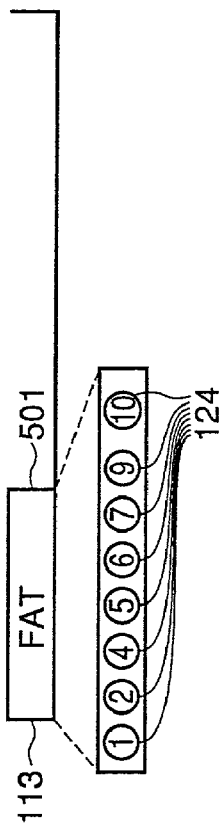
Figure 4D:
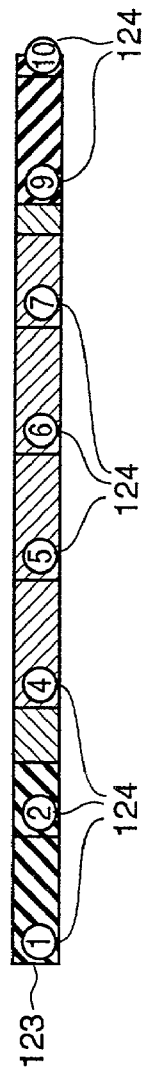
FIG. 4D is a diagram showing a file output in the states of FIG. 4A to FIG. 4C.

Thus, when recording each data in the recording medium 110 in units of the clusters C and generation of the header control information HD, the data body DB and the footer control information FD terminates, states of the respective storage areas become those of FIG. 3A to FIG. 3C, and become those of FIG. 4A to FIG. 4C in subsequent file formation. When there are empty areas in the clusters C where the respective data are written in the data storage area 112 as shown in FIG. 3B at a point of time when generation of the data terminates, dummy data DM are stuffed in the empty areas of the clusters C and areas in the clusters C forming the multimedia information file all become effective areas, as shown in FIG. 4B. Thereafter an FAT 501 of FIG. 4C is generated. As to each of the clusters C of the data area 112, cluster specify information 124 for uniquely specifying the cluster is allocated, as shown in FIG. 4B. At this point, the cluster specify information 124 is shown by ①, ②, ③, . . . •.

For the FAT 501, at least one corresponding cluster specify information 124 is set according to the sequence of at least one cluster C for forming the generated multimedia information file. In reproduction (when the multimedia information file is read from the recording medium 110), the contents of the cluster C of the data area 112 shown by each cluster specify information 124 are read according to the sequence of the cluster specify information 124 recorded in the FAT 501. Thus, the multimedia information file recorded in the recording medium 110 is obtained as a reproduction output file 123 of FIG. 4D.

Figure 5A:
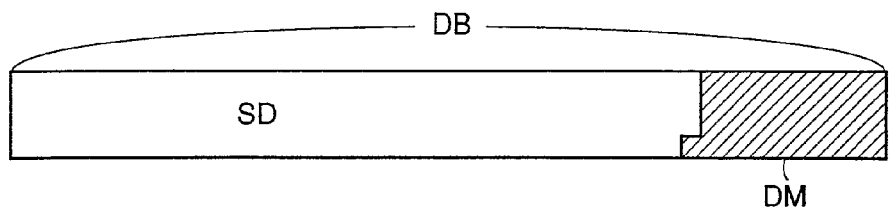
FIG. 5A to FIG. 5D are diagrams illustrating examples of appending systems for dummy data according to the first embodiment of the present invention respectively.
Figure 5B:
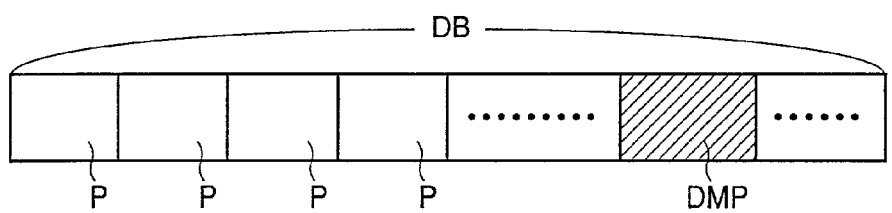

Then, a method of stuffing the dummy data DM in the empty areas of the clusters C is described with reference to FIG. 5A to FIG. 5D. When stuffing of the dummy data DM is executed at a point of time coding source data (raw data) such as a voice or a motion picture, dummy data DM is directly stuffed in coded data SD itself as shown in FIG. 5A, whereby the data body DB is formed. It is of course not restricted to the coded data SD, but the dummy data DM may be directly stuffed with respect to the raw data to form the data body DB. When the dummy data DM is embedded at the time when the source data such as a voice or a motion picture or the coded data SD is converted to packets and multiplexed, a packet (referred to as a dummy data packet DMP) formed by the dummy data DM may be rendered to be multiplexed similarly to other packets P including video data and audio data, as shown in FIG. 5B. In this case, the dummy data packet DMP itself has information related to the packet length, and hence it is possible to perform a skip of the dummy data packet DMP in reproduction on the basis of the information related to the length of the packet of the dummy data packet DMP.

A case where, in generation of the multimedia information file, dummy data DM are stuffed in the file is described with reference to FIG. 5C and FIG. 5D.

Figure 5C:
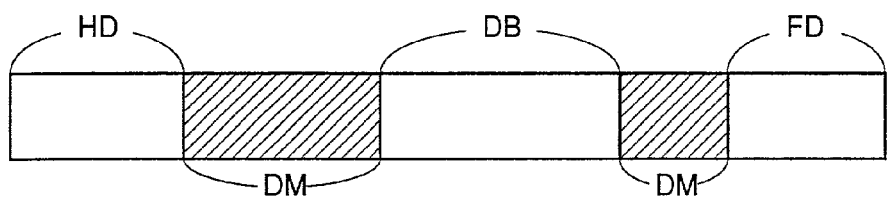

In FIG. 5C, a case where dummy data DM is stuffed in an empty area between the header control information HD and the data body DB or an empty area between the data body DB and the footer control information FD in generation of the multimedia information file is shown. In this case, the dummy data DM is data invalid as head information of the data body DB or as head information of the footer control information FD, for example, such as data consisting of "0" etc., for example. In this case, the area where the dummy data DM is stuffed is seek-processed until the head position of next data is detected, or skip-processed up to the head of a next cluster at the point of time when determined as dummy data. When so specifying the size of area where the corresponding dummy data DM is written is clearly shown on the head part of the area of the dummy data DM, it is also possible to skip the area of the dummy data DM on the basis of the size. As a method of such skipping, a method of treating the area of the dummy data DM as one object (dummy object) unit of ASF can be listed.

Figure 5D:
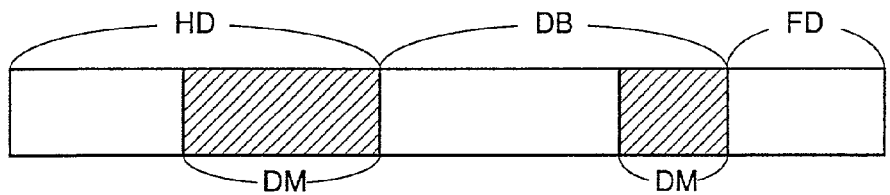

In FIG. 5D, a case where dummy data DM are stuffed in empty areas of clusters C of the tails of the respective ones of the header control information HD and the data body DB is shown. In this case, size information indicating the actual sizes of the respective ones of the header control information HD inclusive of the dummy data DM and the data body DB inclusive of the dummy data DM and the effective sizes of the respective ones of the header control information HD not including the dummy data DM and the data body DB not including the dummy data DM is recorded in areas within the areas of the dummy data DM or other than the areas. In reproduction, there are such a method that the size information of the data recorded in the areas other than the areas of the dummy data DM is referred to when skipping the dummy data DM, such a method that the size information of the areas is written within the areas of the dummy data DM for skipping the areas of the dummy data DM with reference to the size information as having been shown in FIG. 5C, a method of processing the same as one object of ASF, for example, etc.

In this embodiment, as described above, two types of data are not mixed in one cluster C as having been shown in FIG. 21D. Thus, also in edit processing of division and connection of multimedia information files shown in second and third embodiments described later, positions to be accessed in the multimedia information files can be readily known.

Figure 6:
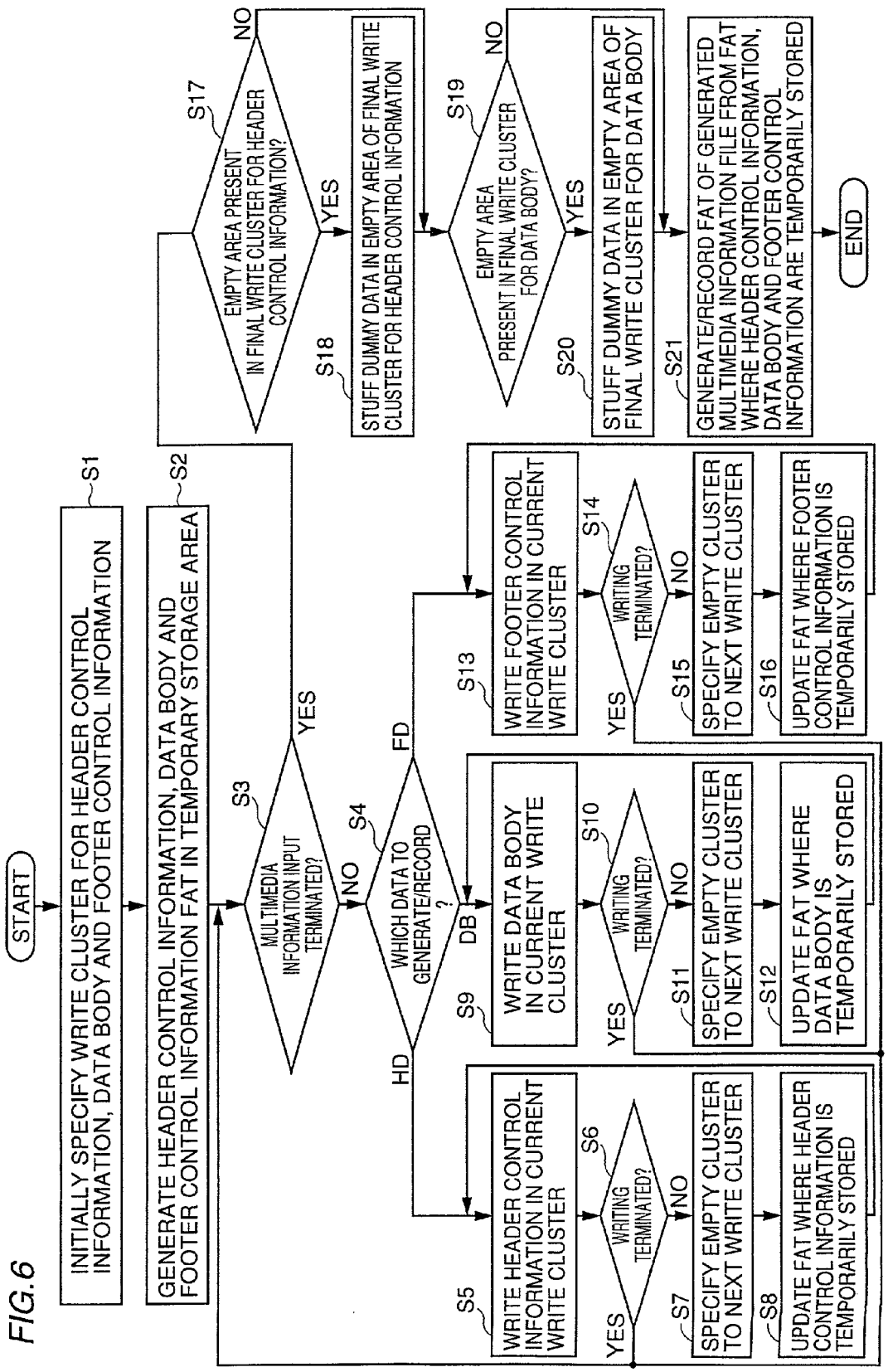
FIG. 6 is a processing flow chart of the multimedia information recording apparatus according to the first embodiment of the present invention.

With reference to a flow chart of FIG. 6, a method of multimedia information recording according to the embodiment of the present invention is described. When write processing of multimedia information 100 in the recording medium 110 is started in the multimedia information recording apparatus of FIG. 1, clusters C of write destinations in the recording medium 110 as to the respective ones of the header control information HD, the data body DB and the footer control information FD are first initially specified (S1), and the FAT temporary storage area 119 is generated (S2).

Whether or not input of the multimedia information 100 in the multimedia information input control part 101 has terminated is determined (S3), and processing subsequent to S17 described later is executed when the input terminates, while what type of data must be generated and recorded is determined on the basis of input data when the input has not terminated (S4). When it is determined that the header control information HD is input at this time, the header control information HD is written in a cluster C currently specified as a write destination while the cluster C specified as the write destination is updated, and the contents of the header FAT temporary storage area 120 are updated with the information of the cluster C of the write destination (see S5 to S8).

When the data body DB is input, the data body DB is written in a cluster C currently specified as a write destination while the cluster C specified as the write destination is updated, and the contents of the data FAT temporary storage area 121 are updated with the information of the cluster C of the write destination (S9 to S12).

When the footer control information FD is input, the footer control information FD is written in a cluster C currently specified as a write destination while the cluster C specified as the write destination is updated, and the contents of the footer FAT temporary storage area 122 are updated with the information of the cluster C of the write destination (S13 to S16).

When the multimedia information 100 consisting of the header control information HD, the data body DB and the footer control information FD is entirely input in the aforementioned manner (Yes at S3), dummy data DM is stuffed in, if there is an empty area in the final cluster C where the respective ones of the header control information HD and the data body DB are written, the empty area by the dummy data appending part 107 (S17 to S20). Thereafter the contents of the FAT temporary storage areas 120 to 122 as to the header control information HD, the data body DB and the footer control information FD are read, and the FAT 501 is generated by the multimedia information file formation part 108 on the basis of the read contents and written in the FAT storage area 113 of the recording medium 110 (S21).

Second Embodiment

The second embodiment of the present invention is now described. In this embodiment, a multimedia information file is divided in a multimedia information recording apparatus. The processing of this division is now described with reference to drawings. In each subsequent drawing, identical numerals are assigned to the same parts as the drawings of the first embodiment, and description thereof is omitted.

Figure 7:
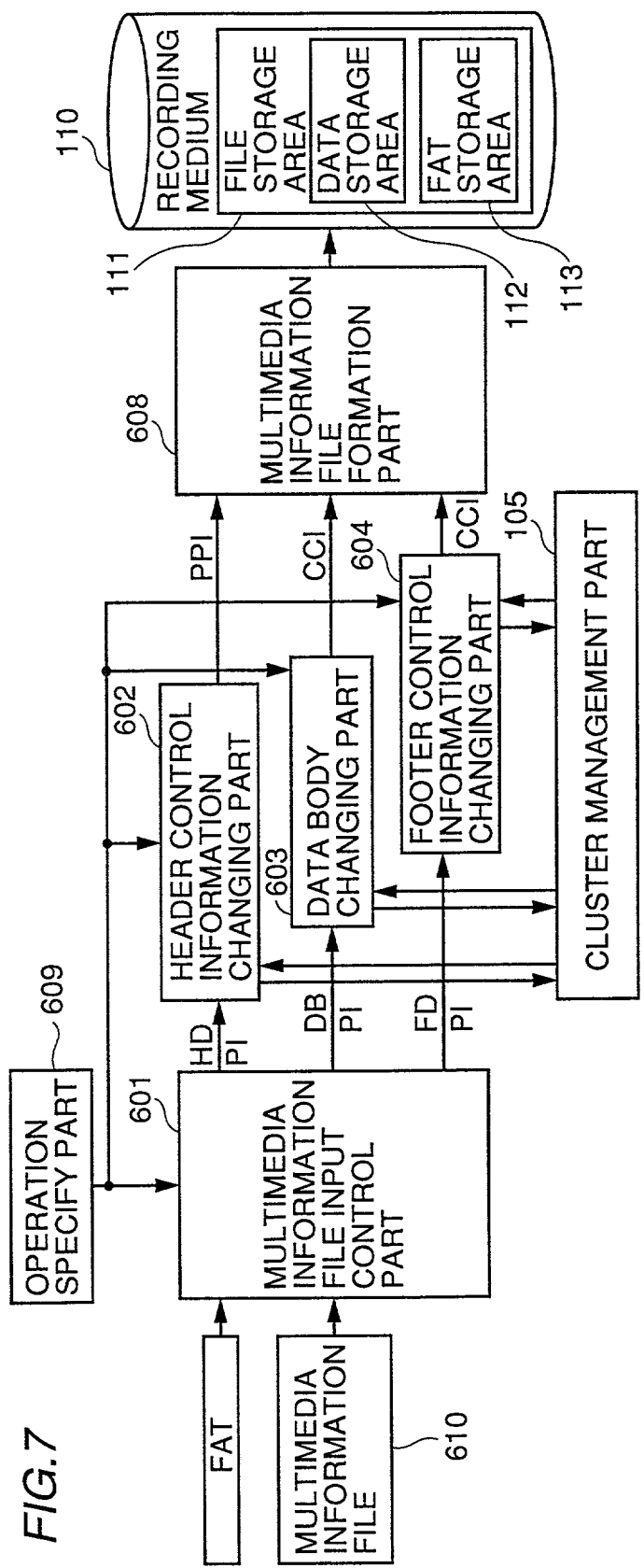
FIG. 7 is a block diagram showing the structure of a multimedia information recording apparatus according to second and third embodiments of the present invention.
Figure 8:
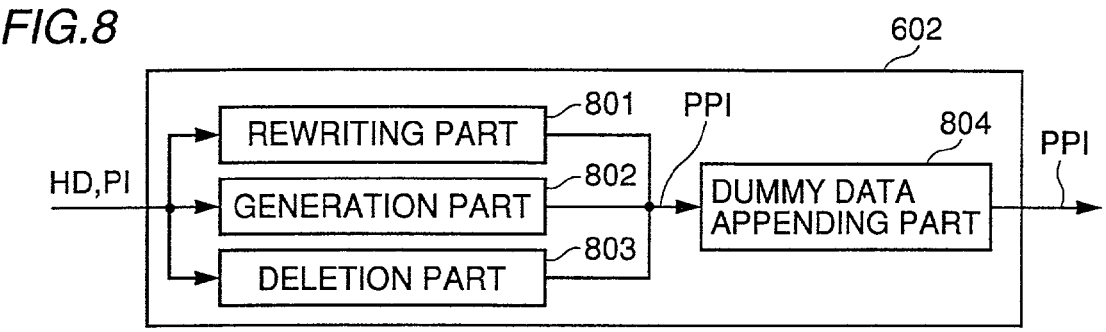
FIG. 8 is a block diagram showing the structure of a header control information changing part in the second and third embodiments of the present invention.
Figure 9:
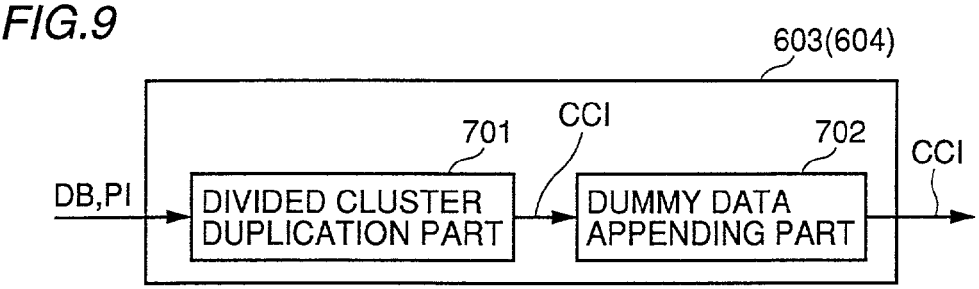
FIG. 9 is a block diagram showing the structure of a data body changing part in the second and third embodiments of the present invention.

Referring to FIG. 7, the multimedia information recording apparatus according to the second embodiment includes a cluster management part 105, a recording medium 110, a multimedia information file input control part 601, a header control information changing part 602 shown in FIG. 8, a data body changing part 603 shown in FIG. 9, a footer control information changing part 604, a multimedia information file formation part 608 and an operation specify part 609.

When division on a prescribed position in a certain multimedia information file 610 is specified by the operation specify part 609, the multimedia information file input control part 601 responsively reads the multimedia information file 610 along with a corresponding FAT, classifies the multimedia information file 610 into header control information HD, a data body DB and footer control information FD and outputs the same, while acquiring and outputting cluster position information PI of a cluster C corresponding to the specified division position on the basis of the input FAT. In practice, processing shown below is performed as to a specific cluster C where the multimedia information file 610 is written on the recording medium, and reading, output etc. of the overall file are not performed.

The header control information changing part 602 includes a rewriting part 801, a generation part 802, a deletion part 803 and a dummy data appending part 804 processing the header control information HD supplied from the multimedia information file input control part 601, as shown in FIG. 8. The rewriting part 801 rewrites the supplied header control information HD for multimedia information files after division. The generation part 802 generates new header control information HD for the multimedia information files after division on the basis of the supplied header control information HD. When the supplied header control information HD becomes unnecessary, the deletion part 803 deletes this. From the respective ones of the rewriting part 801, the generation part 802 and the deletion part 803, cluster position information PPI of the cluster C corresponding to the head control information HD subjected to rewriting, generation and deletion is output. The dummy data appending part 804 accepts and outputs this position information PPI, while determining whether of not to stuff dummy data DM in the cluster C corresponding to the accepted cluster position information PPI and executing stuff processing of the dummy data DM according to the result of determination. On the basis of the cluster position information PPI output from the header control information changing part 602, generation and changing of FAT's (an FAT 502 and an FAT 503 in FIG. 11B) corresponding to the respective ones of the multimedia information files obtained by division are performed in the multimedia information file formation part 608. This is because such processing that information included in the header control information HD and the footer control information FD is not directly divided dissimilarly to the data body DB but converted to contents suitable to the corresponding multimedia information files or generated is applied in general.

The data body changing part 603 includes a divided cluster duplication part 701 performing duplication of the cluster C corresponding to the specified division position and a dummy data appending part 702, as shown in FIG. 9. The dummy data appending part 702 converts, in two clusters C obtained by duplication of the divided cluster duplication part 701, one cluster C to such a cluster C that dummy data DM is stuffed in a precedent area from the division position and converts the other cluster C to such a cluster C that dummy data DM is stuffed in a subsequent area from the division position. The processing at this point may be devised to duplicate data in the cluster C corresponding to the division position to a different empty cluster C and thereafter replace the data in the cluster C corresponding to the division position with dummy data DM. Processing may alternatively be performed to duplicate only the data of the precedent or subsequent area from the division position in the cluster C corresponding to the division position to a different empty cluster C and stuff dummy data DM in the remaining area of the different cluster C.

From the divided cluster duplication part 701, cluster position information CCI of the cluster C subjected to duplication is output to the dummy data appending part 702. The dummy data appending part 702 outputs the supplied cluster position information CCI, while stuffing the dummy data DM in the cluster C shown by this cluster position information PI. Further, the cluster position information CCI is output from the data body changing part 603, and hence generation and changing of the FAT 502 and the FAT 503 corresponding to the respective ones of the multimedia information files obtained by division are performed in the multimedia information file formation part 608 on the basis of the cluster position information CCI.

In this embodiment, it is assumed that ASF is applied to and index information for random access is included in the footer control information FD. In this case, the internal structure of the footer control information changing part 604 becomes a structure similar to the data body changing part 603 shown in FIG. 8.

While it has been assumed here that ASF is applied to the footer control information FD, such a method that the respective ones of the data body DB and the footer control information FD have a local header with respect to the data body DB and a local header with respect to the footer control information FD is employed in ASF. In this embodiment, therefore, a local header is made to be written by the dummy data appending part 702 immediately in front of the division position in the cluster C where the dummy data DM is stuffed in the precedent area from the division position before the dummy data DM is stuffed, in order to cope with this method. In ASF, further, a time stamp for managing a reproduction time etc. is embedded in the data body DB. In the processing of file division according to this embodiment, therefore, time management information for rereading the contents of the time stamp to other contents in reproduction is stuffed immediately in front of the division position when stuffing the dummy data DM in the cluster C similarly to the aforementioned local header, in order not to change the contents of the data body DB.

That included in the footer control information FD is of course not limited to dividable control information such as index information. When undividable control information is included in the footer control information FD, the internal structure of the footer control information changing part 604 becomes a structure similar to the header control information changing part 602 shown in FIG. 9.

Figure 10A:
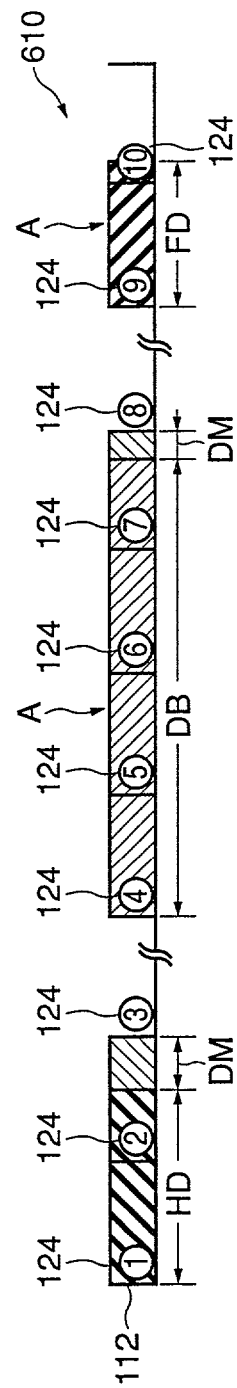
FIG. 10A and FIG. 10B are diagrams illustrating states of respective ones of storage areas before file division processing in the second embodiment of the present invention respectively.
Figure 10B:
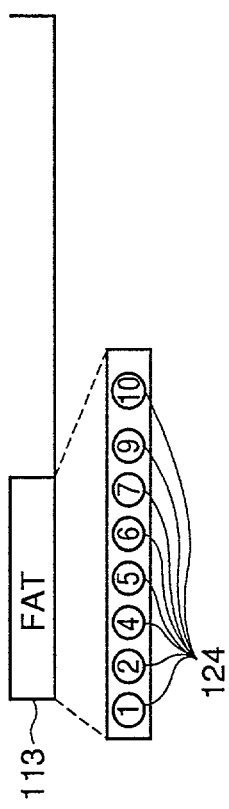
Figure 10C:
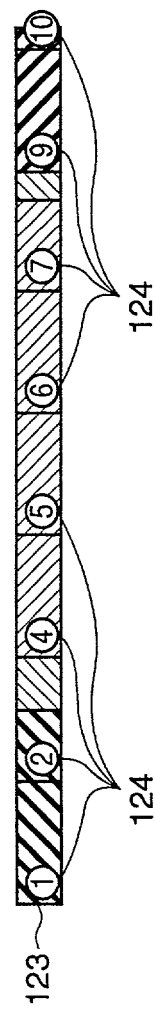
FIG. 10C is a diagram showing a file output in the states of FIG. 10A and FIG. 10B.

In FIG. 10A and FIG. 10B, contents of a file storage area 111 in the recording medium 110 before dividing the multimedia information file are shown. In FIG. 10C, a reproduction output file 123 obtained when the multimedia information file 610 is read from each storage area of FIG. 10A and FIG. 10B in reproduction is shown. The contents of the reproduction output file 123 have such a structure that the contents of each cluster C read from the data storage area 112 according to the contents of the FATs of the FAT storage area 113 are stored according to the read sequence. In the reproduction output file 123 of FIG. 10C, the contents of each cluster C forming the file are shown with corresponding cluster specify information 124, for the purpose of illustration.

In FIG. 11A and FIG. 11B, the contents of the data storage area 112 and the FAT storage area 113 in the recording medium 110 after dividing the multimedia information file are shown respectively. In the respective ones of FIG. 11C and FIG. 11D, reproduction output files 123 obtained when reading the multimedia information file 610 from the respective storage areas of FIG. 11A and FIG. 11B in reproduction are shown respectively. Each of the reproduction output files 123 of FIG. 11C and FIG. 11D is formed by contents of at least one cluster C sequentially read from the data storage area 112 on the basis of the cluster specify information 124 in each of the FAT 502 and the FAT 503. At this point, the contents of each cluster forming the file are shown with the cluster specify information 124 in each of the reproduction output files 123.

When division of the multimedia information file 610 is now instructed by the operation specify part 609 on positions of arrows A in FIG. 10A, the contents of respective ones of clusters (clusters C of ⑤ and ⑨ of FIG. 11A) corresponding to the instructed division positions are duplicated to respective ones of different empty clusters C (clusters C of ⑮ and ⑲ of FIG. 11A), as shown in FIG. 11A and FIG. 11B. Thereafter the respective ones of the clusters (the clusters C of ⑤ and ⑨ of FIG. 11A) on one side in at least one obtained cluster as a result of duplication are converted to clusters C where dummy data DM are stuffed in subsequent areas from the division positions, and the respective ones of the clusters (the clusters C of ⑮ and ⑲ of FIG. 11A) on the other side are converted to clusters C where dummy data DM are stuffed in precedent areas from the division positions. As to the respective ones of two multimedia information files obtained by division, the respective ones of the header control information HD (clusters C of ① and ② and clusters ⑪ and ⑫ of FIG. 11A) are changed and generated, while FATs (the FAT 502 and the FAT 503) are created, to be suitable to the files. At this point, the header control information HD (the clusters C of ① and ② of FIG. 11A) is changed, and the header control information HD (the clusters ⑪ and ⑫ of FIG. 11A) is generated. On the basis of the contents of each created FAT, a plurality of clusters C in each multimedia information file obtained by division are linked. Thus, duplication of data is performed as to the minimum number of clusters C, whereby the multimedia information file 610 can be divided.

In each of the FAT 502 and the FAT 503 of FIG. 11B, cluster specify information 124 for each of at least one cluster C forming the corresponding multimedia information file in the two multimedia information files obtained by division is stored according to the sequence for forming data of the file. When the data of the corresponding clusters C are read from the data storage area 112 according to the cluster specify information 124 stored in the respective ones of the FAT 502 and the FAT 503 in reproduction, therefore, the reproduction output files 123 of FIG. 11C and FIG. 11D are obtained respectively.

While the header control information HD (the clusters C of ① and ② of FIG. 11A) of the file 610 is rewritten when the multimedia information file 610 is divided in FIG. 11A and FIG. 11B, new header control information HD may be generated on different empty clusters C in substitution for rewriting. In this case, the control information of the multimedia information file 610 is held also after the multimedia information file 610 is divided, and hence it becomes possible to smoothly perform cancellation of the division processing etc. This specific example is shown in FIG. 12A to FIG. 12C. That is, when a multimedia information file 610 of FIG. 12A is divided, header control information HD of the multimedia information file 610 is held, and respective ones of header control information HD1 and HD2 corresponding to respective multimedia information files obtained by division are generated on empty clusters C. Therefore, contents of an FAT storage area 113 of FIG. 12B also become contents indicating the new header control information HD1 an HD2.

In this embodiment, division of the multimedia information file 610 is performed in the following manner, in order to divide the multimedia information file 610 without touching the data body DB to the utmost. That is, only data of the cluster C corresponding to the specified division position is duplicated at need, dummy data DM are stuffed in empty areas of the respective ones of two clusters C obtained by duplication, and an FAT corresponding to each multimedia information file obtained by division is created. That is, change is performed only on the data of the cluster C corresponding to the division position, and absolutely no change is performed as to all other clusters C of the data body DB, as having been shown in FIG. 11A. In the multimedia information recording apparatus of FIG. 18, therefore, processing employing the dummy data DM as in this embodiment is not employed, and hence, when a division position is specified in the cluster C in division of the multimedia information file, it is necessary to perform rewriting of data so that data is subjected to storage start from the head position of each cluster C. In the case of this embodiment, on the other hand, the dummy data DM is stuffed in the empty area of the cluster C at need, and hence deviation of the head position of the cluster C and the head position of the data is eliminated by the stuffed dummy data. Therefore, processing such as data rewriting is avoided in this embodiment, and division of the multimedia information file can be readily performed.

While the multimedia file subjected to the file division processing is assumed in this embodiment to be a multimedia information file already having the dummy data DM, e.g., the multimedia information file generated on the recording medium 110 in the first embodiment, it is not restricted to this. That is, it may be the conventional multimedia information file having the cluster C including a boundary, as having been shown in FIG. 21D. At this time, processing of dividing the cluster C including a boundary in FIG. 21D into two of a cluster C where data of the rearmost end part of the head control information HD is stored in a precedent area and the dummy data DM is stuffed in a subsequent area and a cluster C where the dummy data DM is stuffed in a precedent area and data of the head part of the data body DB is stored in a subsequent area by the divided cluster duplication part 701 and the dummy data appending part 702 of FIG. 9 is added. A procedure related to subsequent division processing is similar to the aforementioned one.

The method of division of the multimedia information file according to this embodiment is described with reference to FIG. 13. First, when the multimedia information file 610 to be divided is specified and the division position of the specified multimedia information file 610 is specified through the operation specify part 609 (S30), the multimedia information file input control part 601 inputs the specified multimedia information file 610 (S31) and determines whether a cluster C having a boundary is included in the input multimedia information file 610 (S32). It shifts to processing of S33 described later if the cluster C having a boundary is not determined as included, while duplication is performed as to this cluster C as described above if it is determined as being included, and dummy data DM are stuffed with respect to respective ones of two clusters C (a cluster of a duplication source and a cluster of a duplication destination) obtained by duplication (S35 and S36).

Then, a cluster C in the data body DB corresponding to the specified division position is duplicated by the data body changing part 603, and dummy data DM are stuffed with respect to respective ones of two clusters C (a cluster of a duplication source and a cluster of a duplication destination) obtained by duplication (S33 and S34).

Then, when the footer control information FD is dividable information, processing of generation of a cluster C of the footer control information FD corresponding to the specified division position and stuffing of dummy data DM is performed by the footer control information changing part 604 similarly to the aforementioned data body DB (S47 and S48), and it shifts to processing of S42 described later.

When the footer control information FD is not dividable information, on the other hand, footer control information FD of one file in two multimedia information files obtained by division is generated in at least one empty cluster C, and thereafter whether or not the footer control information FD of the source multimedia information file (the multimedia information file 610) is to be retained is determined (S38 and S39). While the footer control information FD of the source multimedia information file is changed and footer control information FD of the other file is generated as a result (S41) when it may not be retained, the footer control information FD of the other file is newly generated on at least one cluster C (S40) when retaining the same.

Thereafter header control information HD as to each file obtained by division is generated (S42 to S45) similarly to the aforementioned procedure of S38 to S41. FATs of the respective ones of the two multimedia information files obtained by division are generated by the multimedia information file formation part 608, and recorded in the FAT storage area 113 of the recording medium 110 (S46).

Third Embodiment

Connection of multimedia information files according to the third embodiment of the multimedia information recording apparatus of the present invention is described with reference to drawings. In each following drawing, identical numerals are assigned to parts identical to the second embodiment, and description thereof is omitted. In FIG. 14A to FIG. 14D and FIG. 15A to FIG. 15C, the procedure of connection of multimedia information files in the multimedia information recording apparatus according to the third embodiment is shown.

The structure of the multimedia information recording apparatus according to this embodiment is identical to that shown in FIG. 7 to FIG. 9. However, the data body changing part 603 in FIG. 7 is not used and the divided cluster duplication part 701 in the footer control information changing part 604 is not used either in connection of multimedia information files 610.

When the processing of connection of the multimedia information files is started, a plurality of connected multimedia information files 610 are first specified by the operation specify part 609 of FIG. 7, while the sequence of connection between the specified files is specified. A multimedia information file input control part 601 reads the respective ones of the plurality of specified multimedia information files 610 along with corresponding FATs, and outputs the respective ones of the read multimedia information files 610 to each part of a rear stage while classifying the same into header control information HD, data bodies DB and footer control information FD. While the following processing is performed as to specific clusters C, where the respective ones of the multimedia information files 610 are written, present on a recording medium in practice, reading, output etc. of the overall files are not performed.

In a header control information changing part 602, the supplied header control information HD is rewritten by a rewriting part 801 for a multimedia information file after connection, or deleted by a deletion part 803 when becoming unnecessary. Further, new header control information HD is generated by a generation part 802. Thereafter dummy data DM are stuffed with respect to clusters C forming objects by a dummy data appending part 804 at need. At this time, the respective ones of the rewriting part 801, the generation part 802 and the deletion part 803 output cluster position information PPI of the clusters C subjected to rewriting, generation and deletion of the header control information HD to the dummy data appending part 804, and hence the dummy data DM are stuffed with respect to the clusters C specified on the basis of the supplied cluster position information PI in the dummy data appending part 804. From the header control information changing part 602, the position information PPI of the clusters C is output to a multimedia information file formation part 608, and hence an FAT (FAT 504 in FIG. 15B) is generated in the multimedia information file formation part 608 on the basis of the supplied cluster position information PPI.

In the footer control information changing part 604, only the dummy data appending part 702 is employed in the structure shown in FIG. 9, and dummy data DM is stuffed with respect to a prescribed cluster C of the footer control information FD supplied from the multimedia information file input control part 601 by the dummy data appending part 702 at need. Thereafter the multimedia information file formation part 608 generates the FAT (the FAT 504 in FIG. 15B) and records the same on an FAT storage area 113 of a recording medium 110. In the FAT 504, cluster specify information 124 of at least one cluster C forming a new multimedia information file obtained by connection is stored according to the sequence for forming the file.

In ASF, the respective ones of the data body DB and the footer control information FD have a local header with respect to the data body DB and a local header with respect to the footer control information FD. In this embodiment, therefore, it is possible to deal with it by replacing the local headers of the data body DB and the footer control information FD of the multimedia information file connected from behind in mutually connected two multimedia information files with dummy data DM in the dummy data appending part 702. In ASF, further, a time stamp for managing a reproduction time etc. is embedded in the data body DB. In the processing of connection of the multimedia information files according to this embodiment, therefore, time management information for rereading the time stamp in. reproduction is stuffed at the time of stuffing the dummy data DM in substitution for the dummy data DM replaced with the aforementioned local header, in order not to change the data body DB. The time management information is recorded in an area other than the area of the dummy data DM, and it is also possible to reread the time stamp by referring to this recorded time management information in reproduction.

Figure 15A:
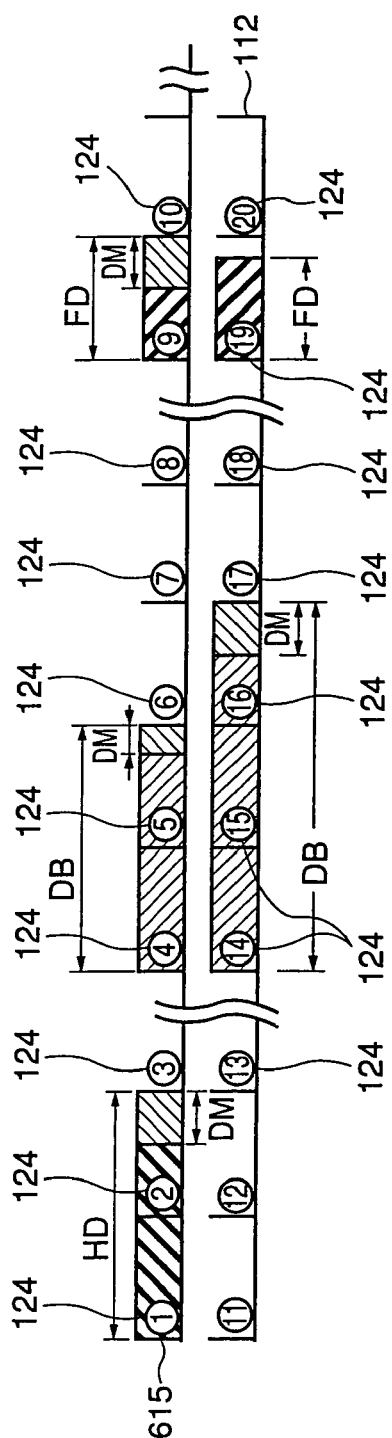
FIG. 15A and FIG. 15B are diagrams illustrating states of respective ones of file storage areas after file connection processing in the third embodiment of the present invention respectively.
Figure 15B:
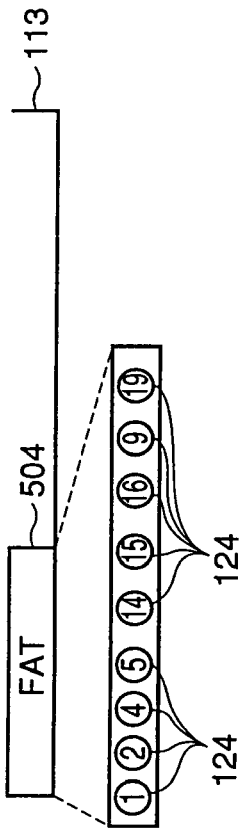

The processing of connecting two multimedia information files in the multimedia information recording apparatus is described with reference to FIG. 14A to FIG. 14D and FIG. 15A to FIG. 15C. It is assumed now that a multimedia information file 614 is connected to the back of a multimedia information file 613 as shown in FIG. 14A, to obtain a multimedia information file 615 of FIG. 15A. Only when there is an empty area in the final cluster C (cluster C of ⑨) of FIG. 15A) of footer control information (index information in this embodiment) FD of the multimedia information file 613 connected from the front at this time, dummy data DM is stuffed in this empty area by the dummy data appending part 702, as shown in FIG. 15A. Thereafter header control information HD of the multimedia information file 613 is changed by the header control information changing part 602, and header control information HD after connection is obtained. All clusters C excluding clusters C where the obtained header control information HD after connection and the header control information HD of the multimedia information files 613 and 614 are written are linked, and the multimedia information file 615 of FIG. 15A is obtained.

Figure 15C:
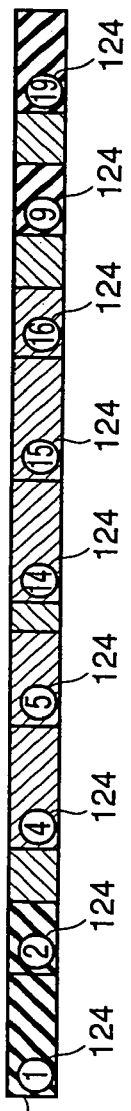
FIG. 15C is a diagram showing a file output in the states of FIG. 15A and FIG. 15B.

When reading the multimedia information file 615 according to the contents of the FAT 504 in reproduction, a reproduction output file 123 shown in FIG. 15C is obtained.

Figure 16A:
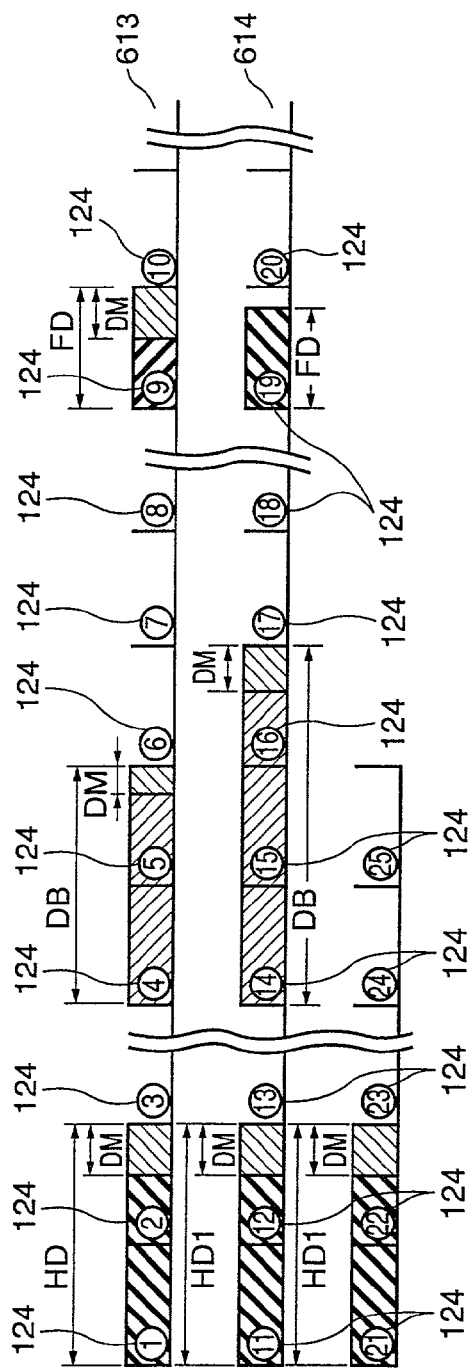
FIG. 16A and FIG. 16B are diagrams illustrating other states of the respective ones of the file storage areas after file connection processing in the third embodiment of the present invention respectively.
Figure 16B:
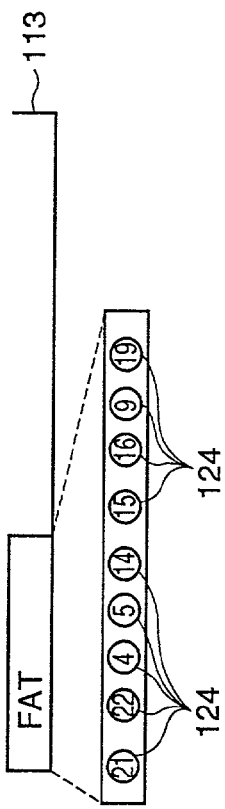
Figure 16C:
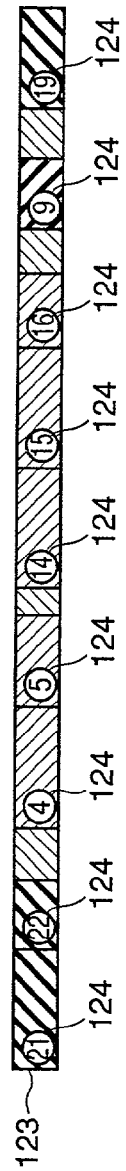
FIG. 16C is a diagram showing a file output in the states of FIG. 16A and FIG. 16B.

In this embodiment, the contents of the header control information HD (clusters C of ① and ② of FIG. 15A) of the multimedia information file 613 are rewritten or the header control information HD (clusters C of ⑪ and ⑫) of FIG. 15A) of the multimedia information file 614 is deleted when the multimedia information file 614 is connected to the back of the multimedia information file 613. In substitution for such rewriting or deletion, however, new header control information HD1 for the multimedia information file obtained by connection may be generated by the generation part 802 on at least one cluster C, as shown in FIG. 16A. In this case, it follows that the header control information HD of the respective ones of the multimedia information file 613 and the multimedia information file 614 is held also after the file connection processing, and hence cancellation of the connection processing etc. can be smoothly performed.

In this embodiment, dummy data DM is stuffed in a prescribed cluster C at need and an FAT 504 for unifying all clusters C of connected multimedia information files is created, in order to connect the multimedia information files while maintaining the contents of clusters C where data bodies DB and footer control information FD are written to the utmost. Thus, connection of a plurality of different multimedia information files is implemented.

In the multimedia information file 615 of FIG. 15A, the dummy data DM is merely stuffed in one cluster C of the footer control information FD, and the contents of the data bodies DB are not at all changed. Deviation of the head positions of the data and the head positions of the clusters C is eliminated since the dummy data DM is stuffed, and hence processing such as data rewriting for eliminating this deviation is avoided. Thus, different multimedia information files can be readily connected.

While the multimedia information files subjected to connection have been assumed to be multimedia information files already having dummy data DM in this embodiment, it is not restricted to this. For example, the conventional multimedia information file having the cluster C including a boundary shown in FIG. 21D may also be subjected to the connection processing. At this time, processing of dividing the cluster C including the boundary in FIG. 21D into a cluster C where data of the rearmost end part of the header control information HD is stored in a front area and dummy data DM is stuffed in a rear area and a cluster C where dummy data DM is stuffed in a front area and data of the head part of the data body DB is stored in a rear area, for example, by the divided cluster duplication part 701 and the dummy data appending part 702 shown in FIG. 8 is added. Processing related to subsequent connection is similar to the aforementioned one.

Figure 17:
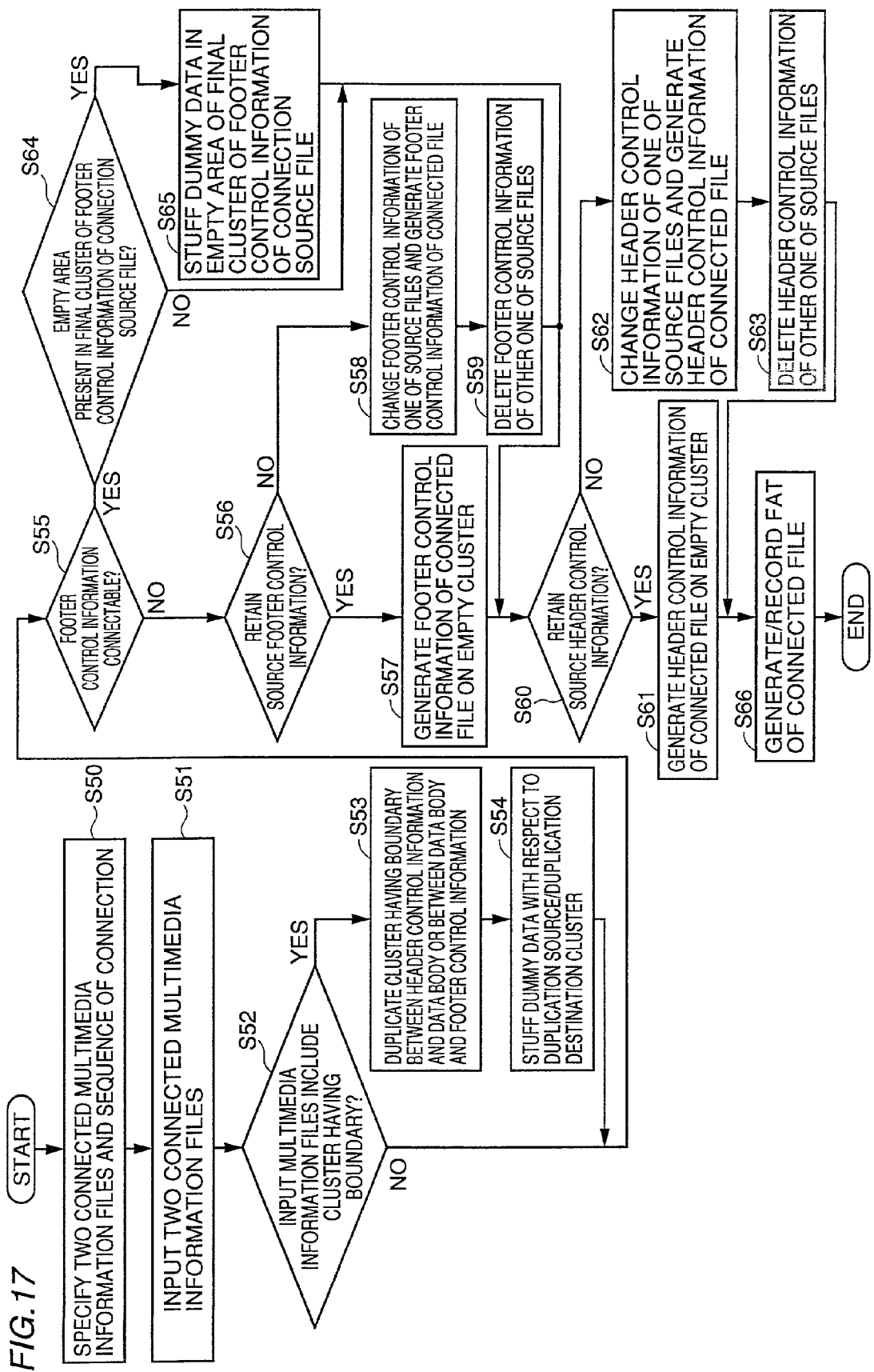
FIG. 17 is a flow chart of file connection processing in the third embodiment of the present invention.

At this point, the method of connection of the multimedia information files 613 and 614 according to the third embodiment is described with reference to FIG. 17. First, when the two connected multimedia information files 613 and 614 and the connection sequence thereof are specified by the operation specify part 609 (S50), the respective ones of the two specified multimedia information files 613 and 614 are input by the multimedia information input control part 601 along with the corresponding FATs (S51). While it shifts to processing of S55 described later when clusters C including boundaries are not included in the respective ones of the input multimedia information files 613 and 614, processing similar to S35 and S36 of the aforementioned FIG. 13 is performed if included (S53 and S54).

When the footer control information FD (clusters C of ⑨ and ⑲ of FIG. 14A) of the two multimedia information files 613 and 614 is determined as connectable, the dummy data DM is stuffed, if there is an empty area in the final cluster C (the cluster C ⑨ of FIG. 15A) of the footer control information FD of the file of the connection source, therein, and it shifts to processing of S60 described later.

When connection of the footer control information FD of the two multimedia information files 613 and 614 is determined as impossible, on the other hand, whether to retain the connected footer control information FD is determined (S56), and if retaining the same, footer control information FD for the multimedia information file 615 obtained by connection is generated on at least one empty cluster C (S57). If not retaining it, on the other hand, the footer control information FD of one multimedia information file to be connected is changed to the footer control information FD for the multimedia information file 615 obtained by connection, the footer control information FD of the other multimedia information file to be connected is deleted (S58 and S59), and it shifts to processing of S60 described later.

Then, processing similar to the footer control information FD shown in S56 to S59 is performed (S60 to S63), in order to obtain the header control information HD of the multimedia information file 615 obtained by connection. Thereafter the FAT 504 of the multimedia information file 615 obtained by connection is generated by the multimedia information file formation part 608, and written in the FAT storage area 113 in the recording medium 110.

While the present invention has been described in detail with reference to the drawings, these are illustrative to the utmost and not at all limit the present invention, and the subject matter and the range of the present invention are limited only by the attached scope of claim for patent.

The invention claimed is:

1. A multimedia information recording apparatus recording a multimedia information file having a data body including data for forming an image and control information for controlling said data body on a recording medium every specific area having a specific size, wherein said recording medium at least has a data area where said multimedia information file is recorded and a management information area where information for managing the state of arrangement of said multimedia information file recorded in said data area is recorded, said multimedia information recording apparatus comprising:

file writing means for specifying a plurality of said specific areas of said data area being in an empty state capable of data writing and writing said data body and said control information in said specified plurality of specific areas in an arbitrary sequence in parallel;

dummy data writing means for writing dummy data in an area in an empty state in at least one of said specified plurality of specific areas after said data body and said control information are written by said file writing means; and link information writing means creating area link information for linking at least one said specific area where said data body and said control information are written by said file writing means according to the sequence for forming said multimedia information file and writing said area link information in said management information area.

2. A multimedia information recording apparatus recording a multimedia information file having a data body including data for forming an image and control information for controlling said data body on a recording medium every specific area having a specific size while dividing said multimedia information file into a plurality of different multimedia information files on a prescribed position, wherein said recording medium at least has a data area where said multimedia information file is recorded and a management information area where information for managing the state of arrangement of said multimedia information file in said data area is recorded, said multimedia information recording apparatus comprising:

data body changing means for duplicating contents recorded in said specific area corresponding to said specific position in said data body and writing said contents obtained by duplication in said specific area of said data area being in an empty state capable of being written with data while writing dummy data with respect to, in two said specific areas where identical said contents are recorded by duplication, respective ones of a precedent area from said prescribed position in one said specific area and a subsequent area from said prescribed position in the other said specific area;

control information generation means generating said specific area where said control information for the respective ones of said multimedia information files obtained by division is written; and link information writing means creating area link information for linking a plurality of said specific areas where said data body and said control information are written, including at least one said specific area where said data body and said control information are written by said data body changing means and said control information generation means, according to the sequence for forming the respective ones of said multimedia information files obtained by division and writing said area link information in said management information area.

3. The multimedia information recording apparatus according to claim 2, further comprising dummy data writing means writing the dummy data in the area of said empty state in said specific area where said control information is written by said control information generation means.

4. The multimedia information recording apparatus according to claim 2, wherein said control information generation means generates said control information corresponding to the respective ones of said multimedia information files obtained by division in respective ones of a plurality of said specific areas in said data area on the basis of said control information of said multimedia information file before being divided.

5. The multimedia information recording apparatus according to claim 4, wherein at least one said specific area where said control information of said multimedia information file before being divided has been recorded and at least one said specific area of said empty state in said data area are included in said plurality of specific areas.

6. The multimedia information recording apparatus according to claim 4, wherein each of said plurality of specific areas is said specific area of said empty state in said data area.

7. A multimedia information recording apparatus recording a plurality of multimedia information files having data bodies including data for forming images and control information for controlling said data bodies on a recording medium every specific area having a specific size while connecting said plurality of multimedia information files into a single multimedia information file, wherein said recording medium at least has a data area where said multimedia information files are recorded and a management information area where information for managing the state of arrangement of said multimedia information files in said data area is recorded, said multimedia information recording apparatus comprising:

control information generation means for generating said specific area where said control information for said multimedia information file obtained by connection is written;

link information writing means creating area link information for linking at least one said specific area where said data bodies of said plurality of multimedia information files are written and said specific area where said control information is written by said control information generation means according to the sequence for forming said multimedia information file obtained by connection and writing said area link information in said management information area; and dummy data writing means for writing dummy data in an area of said empty state in said specific area where said control information is written by said control information generation means.

8. The multimedia information recording apparatus according to claim 7, wherein said control information generation means has:

changing means changing the contents of said specific area where said control information of arbitrary said multimedia information file of said plurality of multimedia information files is written to said control information for said multimedia information file obtained by connection, and deletion means deleting partial contents of said specific area where said control information of another said multimedia information file of said plurality of multimedia information files is written.

9. The multimedia information file recording apparatus according to claim 7, wherein said control information generation means has:

writing means for writing said control information for said multimedia information file obtained by connection in said specific area of said empty state of said data area.

10. A multimedia information recording method recording a multimedia information file having a data body including data for forming an image and control information for controlling said data body on a recording medium every specific area having a specific size, wherein said recording medium at least has a data area where said multimedia information file is recorded and a management information area where information for managing the state of arrangement of said multimedia information file recorded in said data area is recorded, said multimedia information recording method comprising:

a file writing step of specifying a plurality of said specific areas of said data area being in an empty state capable of data writing and writing said data body and said control information in said specified plurality of specific areas in an arbitrary sequence in parallel;
a dummy data writing step of writing dummy data in an area in an empty state in at least one of said specified plurality of specified areas after said data body and said control information are written by said file writing step; and
a link information writing step of creating area link information for linking at least one said specific area where said data body and said control information are written by said file writing step according to the sequence for forming said multimedia information file and writing said area link information in said management information area.

11. A multimedia information recording method recording a multimedia information file having a data body including data for forming an image and control information for controlling said data body on a recording medium every specific area having a specific size while dividing said multimedia information file into a plurality of different multimedia information files on a prescribed position, wherein
said recording medium at least has a data area where said multimedia information file is recorded and a management information area where information for managing the state of arrangement of said multimedia information file in said data area is recorded,
said multimedia information recording method comprising:
a data body changing step of duplicating contents recorded in said specific area corresponding to said prescribed position in said data body and writing said contents obtained by duplication in said specific area of said data area being in an empty state capable of being written with data while writing dummy data with respect to, in two said specific areas where identical said contents are recorded by duplication, respective ones of a precedent area from said prescribed position in one said specific area and a subsequent area from said prescribed position in another said specific area;
a control information generation step of generating said specific area where said control information for the respective ones of said multimedia information files obtained by division is written; and
a link information writing step of creating area link information for linking a plurality of said specific areas where said data body and said control information are written, including at least one said specific area where said data body and said control information are written by said data body changing step and said control information generation step, according to the sequence for forming the respective ones of said multimedia information files obtained by division and writing said area link information in said management information area.

12. A multimedia information recording method recording a plurality of multimedia information files having data bodies including data for forming images and control information for controlling said data bodies on a recording medium every specific area having a specific size while connecting said plurality of multimedia information files into a single multimedia information file, wherein
said recording medium at least has a data area where said multimedia information files are recorded and a management information area where information for managing the state of arrangement of said multimedia information files in said data area is recorded,
said multimedia information recording method comprising:
a control information generation step of generating said specific area where said control information for said multimedia information file obtained by connection is written; and
a link information writing step of creating area link information for linking at least one said specific area where said data bodies of said plurality of multimedia information files are written and said specific area where said control information is written by said control information generation step according to the sequence for forming said multimedia information file obtained by connection and writing said area link information in said management information area; and
a dummy data writing step of writing dummy data in an area of said empty state in said specific area where said control information is written by said control information generation step.

13. A multimedia information recording apparatus recording a multimedia information file having a data body including data for forming an image and control information for controlling said data body on a recording medium every specific area having a specific size while dividing said multimedia information file into a plurality of different multimedia information files on a prescribed position, wherein
said recording medium at least has a data area where said multimedia information file is recorded and a management information area where information for managing the state of arrangement of said multimedia information file in said data area is recorded,
said multimedia information recording apparatus comprising:
data body changing means duplicating contents recorded in said specific area corresponding to said prescribed position in said data body and writing said contents obtained by duplication in said specific area of said data area being in an empty state capable of being written with data while writing dummy data with respect to a precedent area from said prescribed position in one said specific area in two said specific areas where identical said contents are recorded by duplication;
control information generation means generating said specific area where said control information for the respective ones of said multimedia information files obtained by division is written; and
link information writing means creating area link information for linking a plurality of said specific areas where said data body and said control information are written, including at least one said specific area where said data body and said control information are written by said data body changing means and said control information generation means, according to the sequence for forming the respective ones of said multimedia information files obtained by division and writing created said area link information in said management information area.

14. A multimedia information recording apparatus recording a multimedia information file having a data body including data for forming an image and control information for controlling said data body on a recording medium every specific area having a specific size while dividing said multimedia information file into a plurality of different multimedia information files on a prescribed position, wherein said recording medium at least has a data area where said multimedia information file is recorded and a management information area where information for managing the state of arrangement of said multimedia information file in said data area is recorded, said multimedia information recording apparatus comprising:

data body changing means duplicating data of a subsequent area from said prescribed position in contents recorded in said specific area corresponding to said prescribed position in said data body and writing said contents obtained by duplication in said specific area of said data area being in an empty state capable of being written with data while writing dummy data with respect to an empty area other than the area where said duplicated data is written in said specific area;

control information generation means generating said specific area where said control information for the respective ones of said multimedia information files obtained by division is written; and link information writing means creating area link information for linking a plurality of said specific areas where said data body and said control information are written, including at least one said specific area where said data body and said control information are written by said data body changing means and said control information generation means, according to the sequence for forming the respective ones of said multimedia information files obtained by division and writing created said area link information in said management information area.

15. A multimedia information reproducing apparatus reproducing a multimedia information file having a data body including data for forming an image and control information including information as to overall said file and for controlling said data body on a recording medium, wherein said control information includes dummy data so that said control information is in a prescribed size, and said multimedia information file is recorded by a multimedia information recording apparatus comprising file writing means writing said data body and control information including said dummy data on said recording medium and means writing size information indicating the actual size of said control information including said dummy data and the size of said dummy data on said recording medium, the multimedia information reproducing apparatus comprising:

means for skipping an area where dummy data is written and reading control information except said dummy data on the basis of size information indicating the actual size of said control information including said dummy data and the size of said dummy data, and means for reproducing said control information except said dummy data and a data body of said multimedia information file.

* * * * *